United States Patent
Jeong et al.

(10) Patent No.: US 10,809,896 B2
(45) Date of Patent: Oct. 20, 2020

(54) DISPLAY APPARATUS AND CONTROL METHOD THEREOF

(71) Applicant: Samsung Electronics Co., Ltd., Suwon-si, Gyeonggi-do (KR)

(72) Inventors: Hun-seop Jeong, Seongnam-si (KR); Keun-seob Kim, Suwon-si (KR); Jin-woo Song, Seoul (KR); Hong-uk Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 15/803,265

(22) Filed: Nov. 3, 2017

(65) Prior Publication Data
US 2018/0121060 A1     May 3, 2018

(30) Foreign Application Priority Data
Nov. 3, 2016   (KR) .......................... 10-2016-0145750

(51) Int. Cl.
*G06F 3/048*       (2013.01)
*G06F 3/0484*      (2013.01)
(Continued)

(52) U.S. Cl.
CPC ........ *G06F 3/04842* (2013.01); *G06F 3/0416* (2013.01); *G06F 3/0482* (2013.01);
(Continued)

(58) Field of Classification Search
CPC ... G06F 3/0488; G06F 3/04842; G06F 3/0482
See application file for complete search history.

(56) References Cited

U.S. PATENT DOCUMENTS 5,822,599 A * 10/1998 Kidder ...................... G06F 1/32
                                                        713/324
5,881,299 A *  3/1999 Nomura ................ G06F 1/3218
                                                        713/324
(Continued)

FOREIGN PATENT DOCUMENTS

KR   10-2015-0024073 A   3/2015
KR      10-1537629 B1    7/2015

OTHER PUBLICATIONS

Extended European Search Report dated Jul. 25, 2019, issued in European Patent Application No. 17866418.1-1224.

*Primary Examiner* — Nicholas Augustine
(74) *Attorney, Agent, or Firm* — Jefferson IP Law, LLP

(57) ABSTRACT

A display apparatus and a method of controlling a display apparatus are provided. The display apparatus includes a display configured to display a screen including a plurality of objects, an input device configured to receive a predefined user command while the screen is displayed, and at least one processor configured to, in response to the predefined user command being input, enter a setting mode for selecting an always-on display object, in response to at least one of the plurality of objects being selected by user input during the setting mode, set a selected object to an always-on display object, and in response to a mode of the display apparatus being changed to a standby mode, control the display to display the selected object on a monochrome background screen.

19 Claims, 25 Drawing Sheets

(51) Int. Cl.
*G06F 3/041* (2006.01)
*G06F 3/0482* (2013.01)
*G06F 3/0488* (2013.01)
*G06F 9/451* (2018.01)
*G06F 9/445* (2018.01)
*G06F 3/01* (2006.01)
*G06F 9/4401* (2018.01)

(52) U.S. Cl.
CPC ........ *G06F 3/0488* (2013.01); *G06F 9/44505* (2013.01); *G06F 9/451* (2018.02); *G06F 9/4418* (2013.01)

(56) References Cited

U.S. PATENT DOCUMENTS

| | | | | |
|---|---|---|---|---|
| 5,991,546 | A * | 11/1999 | Chan | G06F 13/385 710/313 |
| 6,205,318 | B1 * | 3/2001 | Schindler | H04N 5/4401 345/212 |
| 6,342,908 | B1 * | 1/2002 | Bates | G06F 3/0481 715/789 |
| 6,574,629 | B1 * | 6/2003 | Cooke, Jr. | G06F 16/40 |
| 6,801,811 | B2 * | 10/2004 | Ranganathan | G06F 1/3203 700/22 |
| 6,900,798 | B2 * | 5/2005 | Heie | G09G 3/3611 345/211 |
| 6,912,664 | B2 * | 6/2005 | Ranganathan | G06F 1/3203 345/98 |
| 6,934,772 | B2 * | 8/2005 | Bui | G06F 1/3218 315/174 |
| 7,002,593 | B2 * | 2/2006 | Milch | G09G 3/3208 345/211 |
| 7,036,025 | B2 * | 4/2006 | Hunter | G09G 3/342 700/12 |
| 7,614,011 | B2 * | 11/2009 | Karidis | G06F 1/3203 715/789 |
| 9,075,612 | B2 | 7/2015 | Yang et al. | |
| 2003/0009654 | A1 * | 1/2003 | Nalawadi | G06F 9/4401 713/1 |
| 2003/0009705 | A1 * | 1/2003 | Thelander | G06F 1/3203 713/340 |
| 2007/0252822 | A1 | 11/2007 | Kim et al. | |
| 2008/0195961 | A1 | 8/2008 | Bae et al. | |
| 2009/0259958 | A1 | 10/2009 | Ban | |
| 2010/0152554 | A1 * | 6/2010 | Steine | A61B 5/4833 600/309 |
| 2012/0046079 | A1 | 2/2012 | Kim et al. | |
| 2013/0067376 | A1 | 3/2013 | Kim et al. | |
| 2013/0147771 | A1 | 6/2013 | Chuang et al. | |
| 2014/0289660 | A1 | 9/2014 | Min | |
| 2015/0054800 | A1 | 2/2015 | Kim et al. | |
| 2015/0082255 | A1 | 3/2015 | Devries et al. | |
| 2016/0049106 | A1 | 2/2016 | Connell et al. | |
| 2016/0078795 | A1 | 3/2016 | Yeon et al. | |
| 2016/0141869 | A1 * | 5/2016 | Byron | G05B 15/02 700/291 |
| 2018/0063434 | A1 * | 3/2018 | Seol | H04N 5/23293 |
| 2018/0120985 | A1 * | 5/2018 | Wallace | G06F 1/169 |
| 2018/0324567 | A1 * | 11/2018 | Mao | H04M 1/725 |

\* cited by examiner

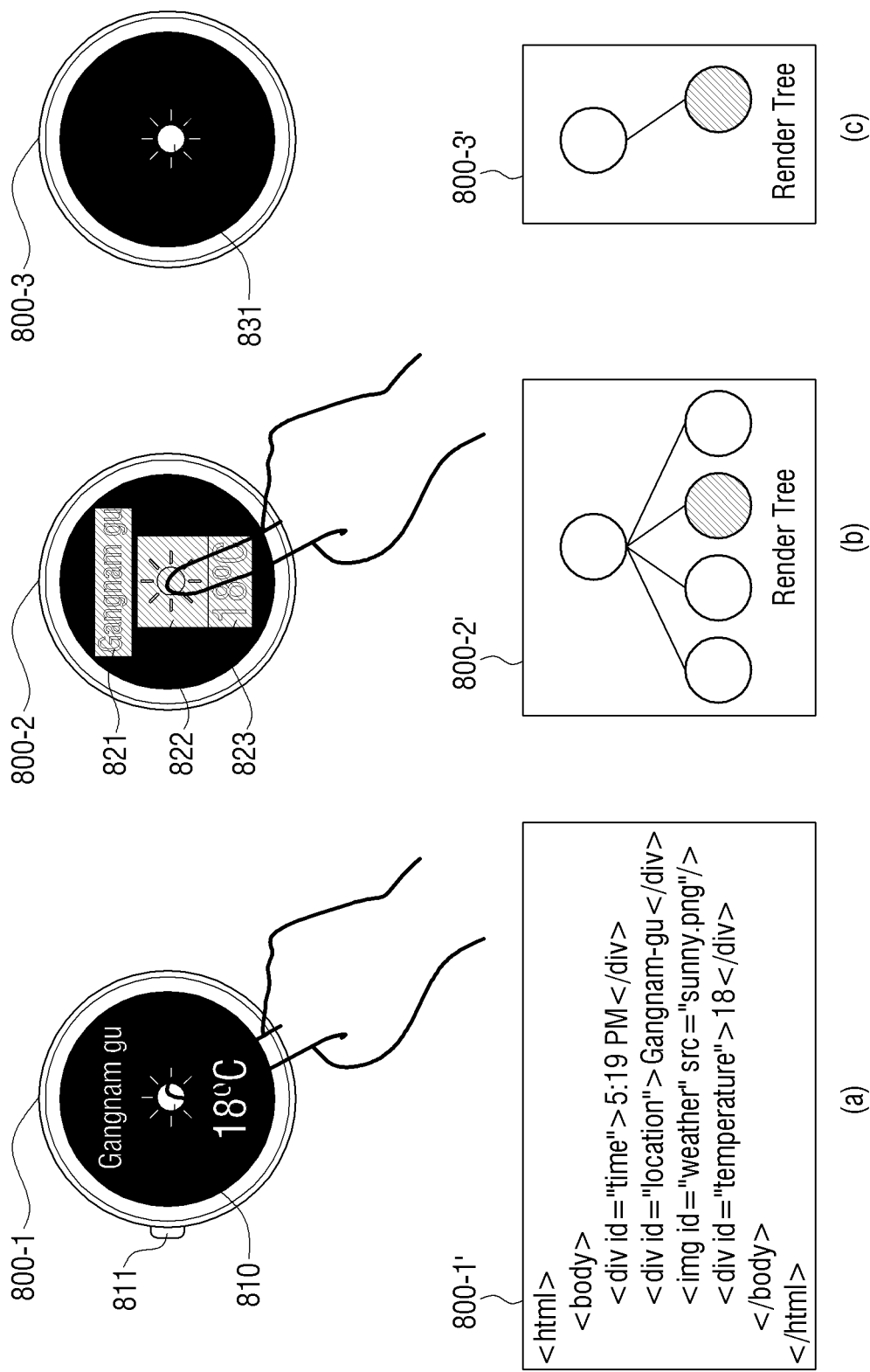

FIG. 8A
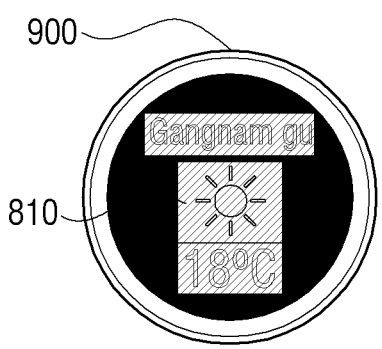
(a)
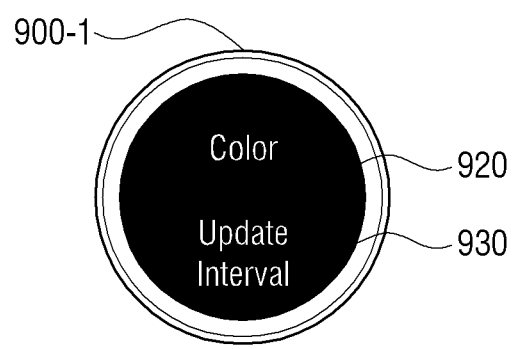
(b)
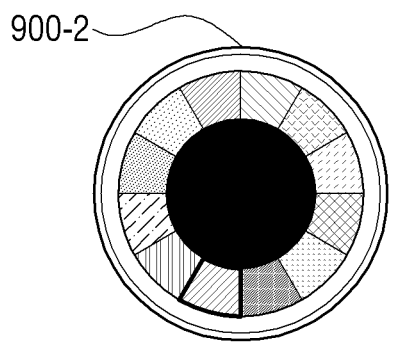
(c)
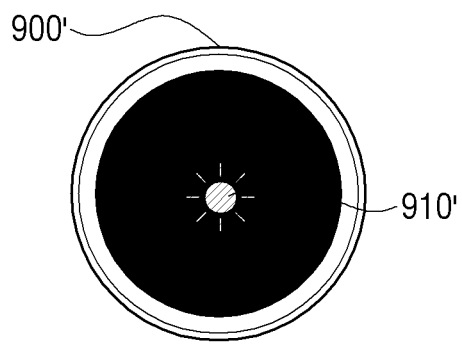
(d)

FIG. 8B
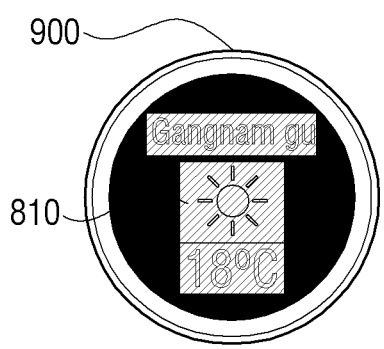
(a)
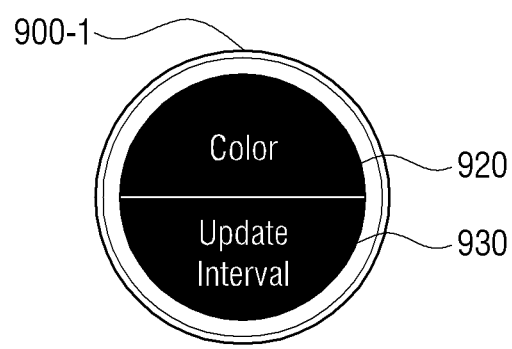
(b)
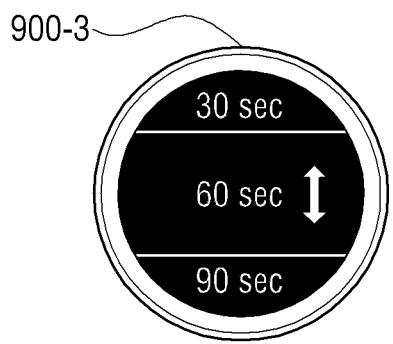
(c)
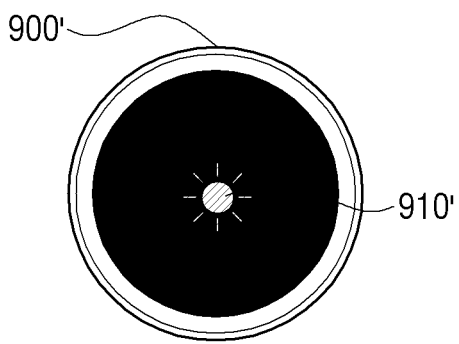
(d)

(a)                  (b)

(a)            (b)            (c)

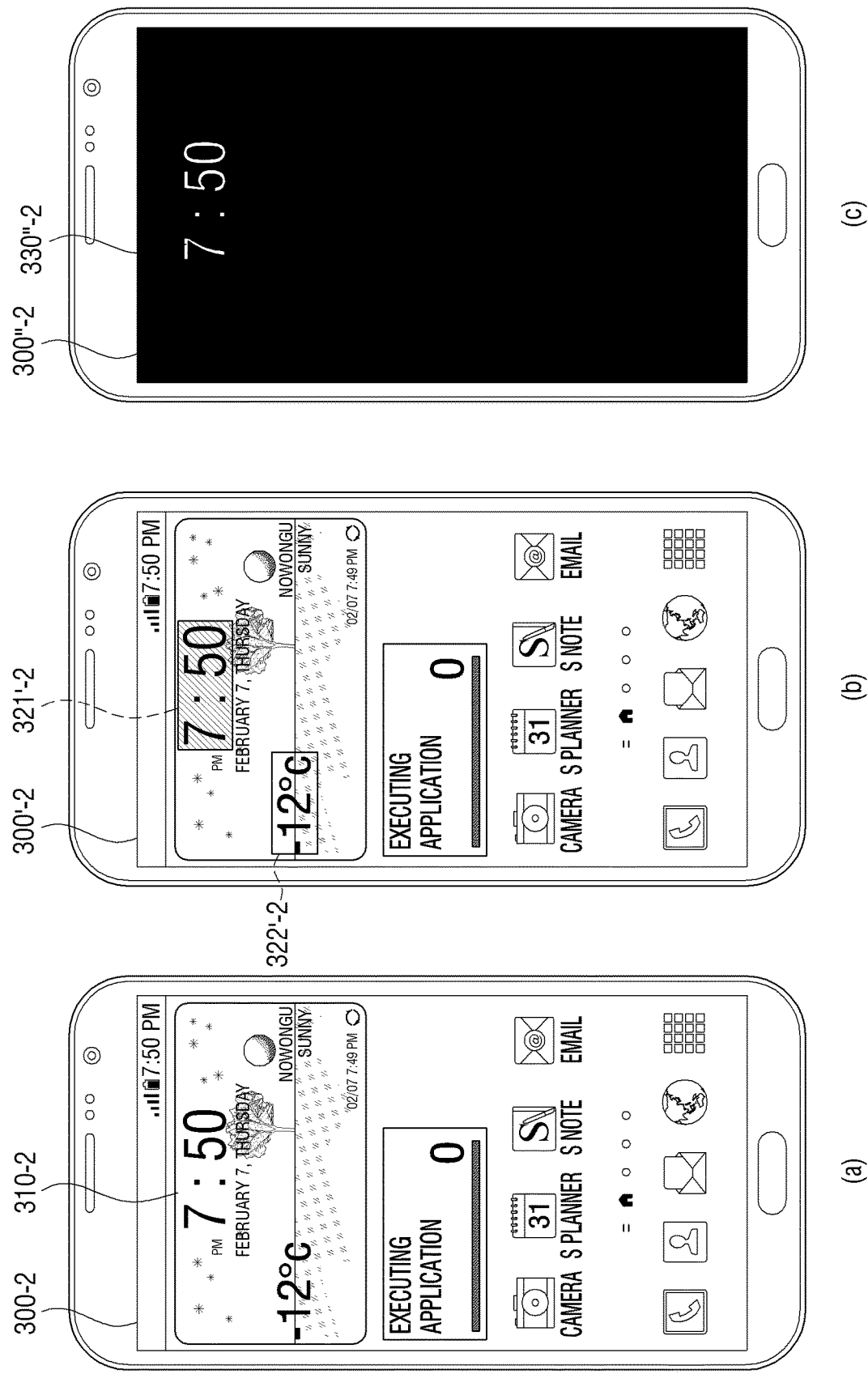

FIG. 9C
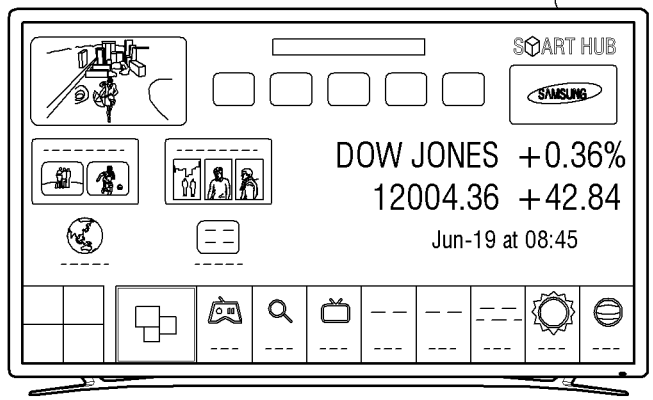
(a)
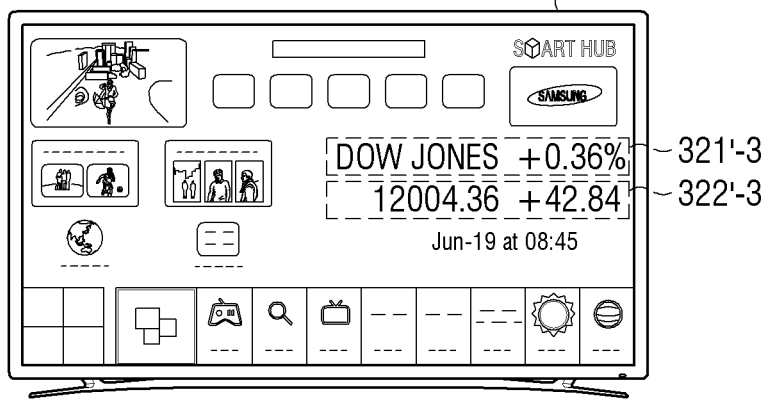
(b)
(c)

(a)                              (b)

FIG. 11
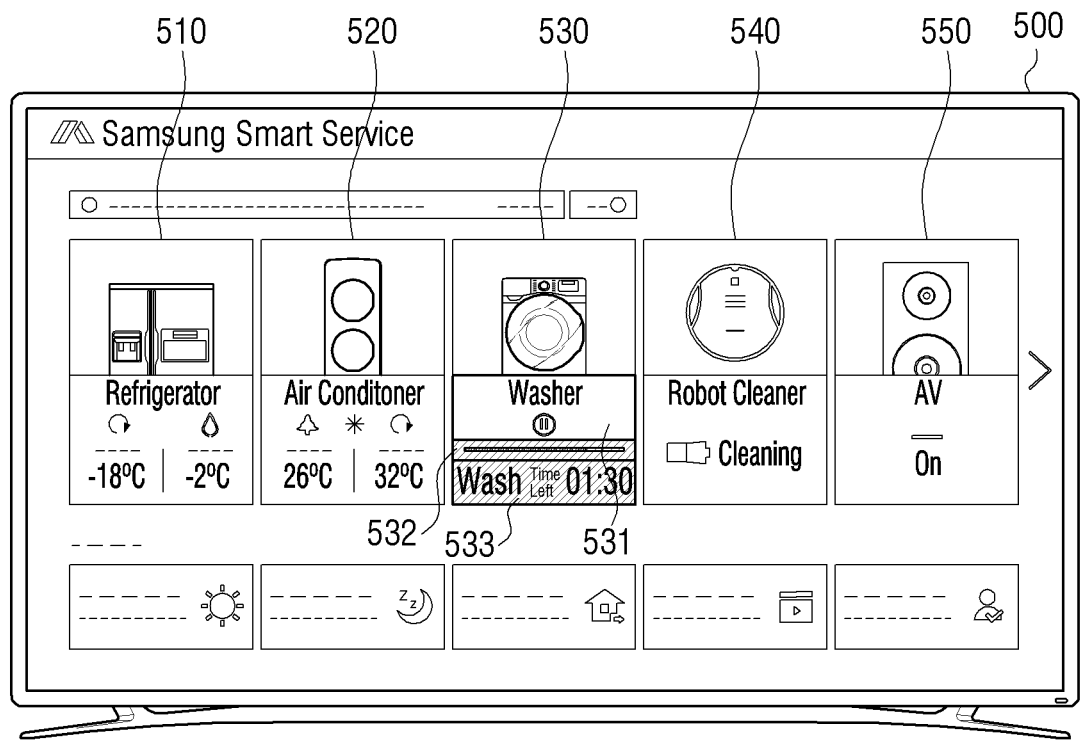
(a)
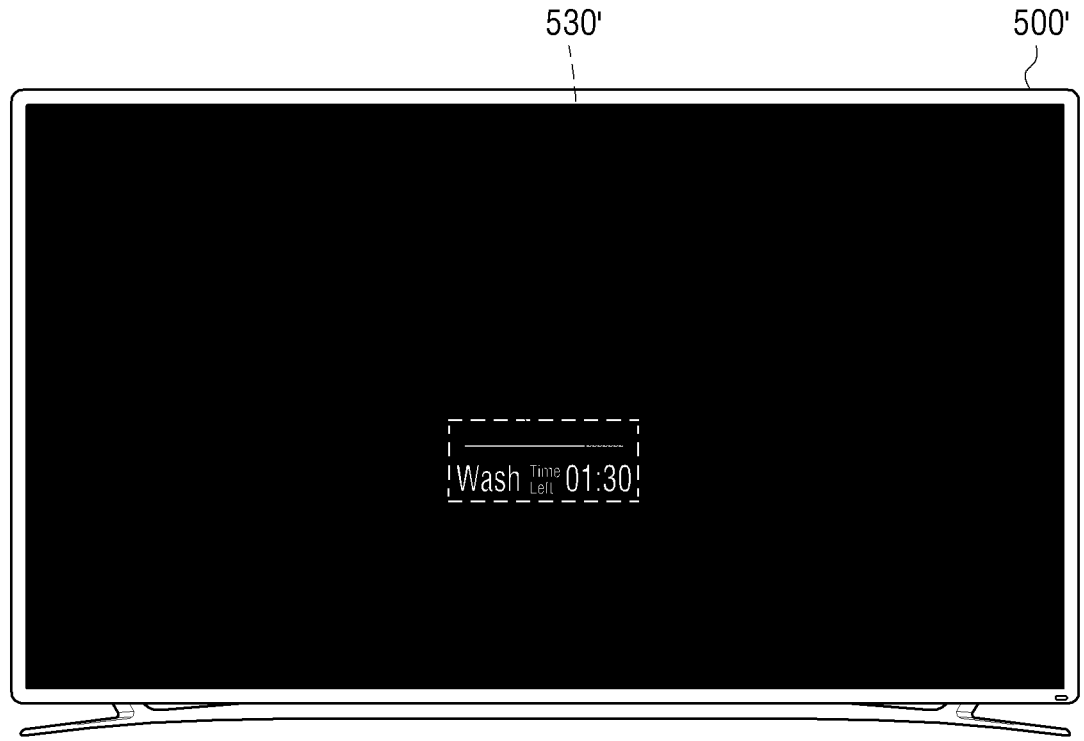
(b)

(a)            (b)

FIG. 13
(a)  (b)

(a)  (b)

(a)          (b)

FIG. 17
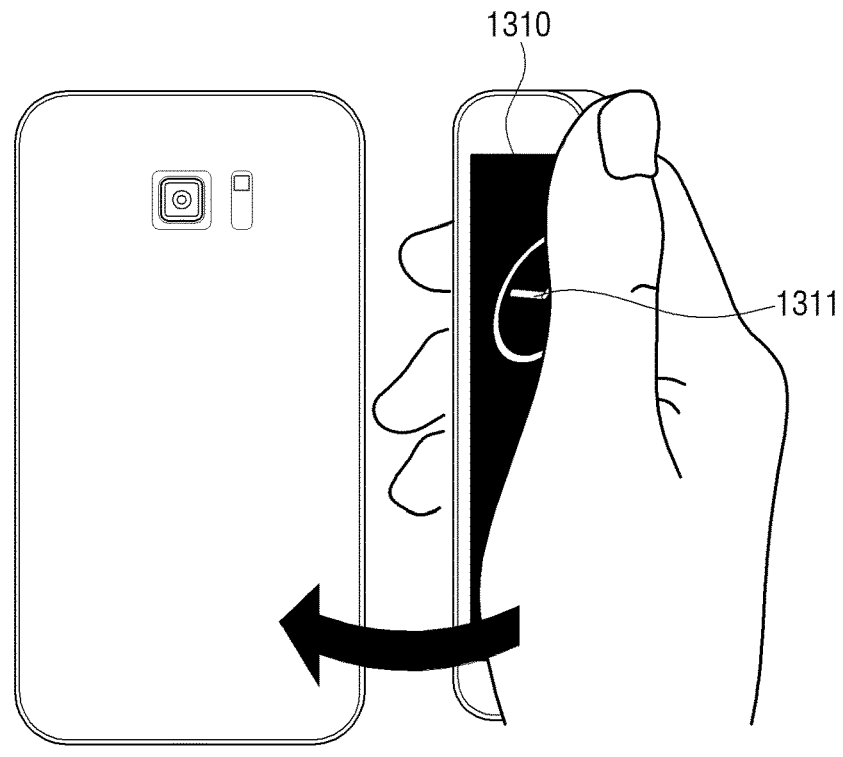
(a)
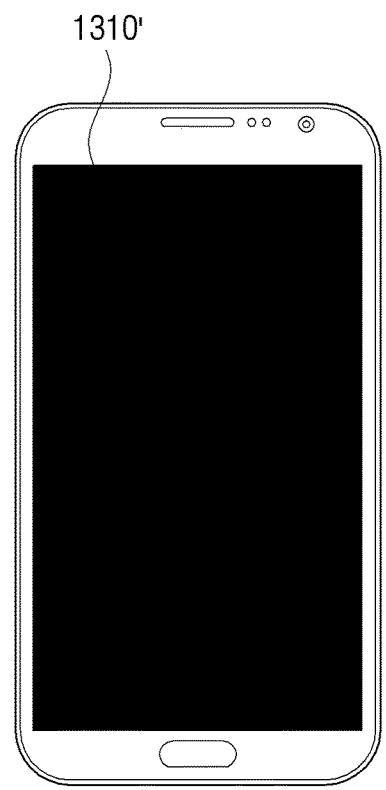
(b)

FIG. 18
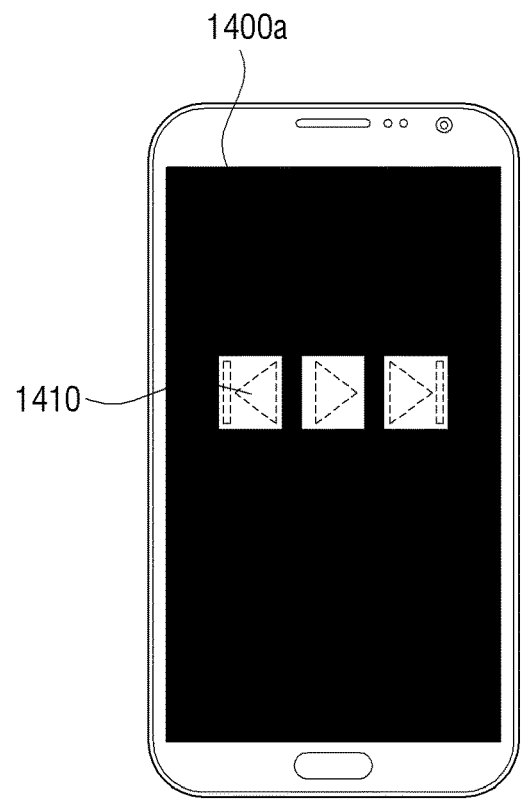
(a)
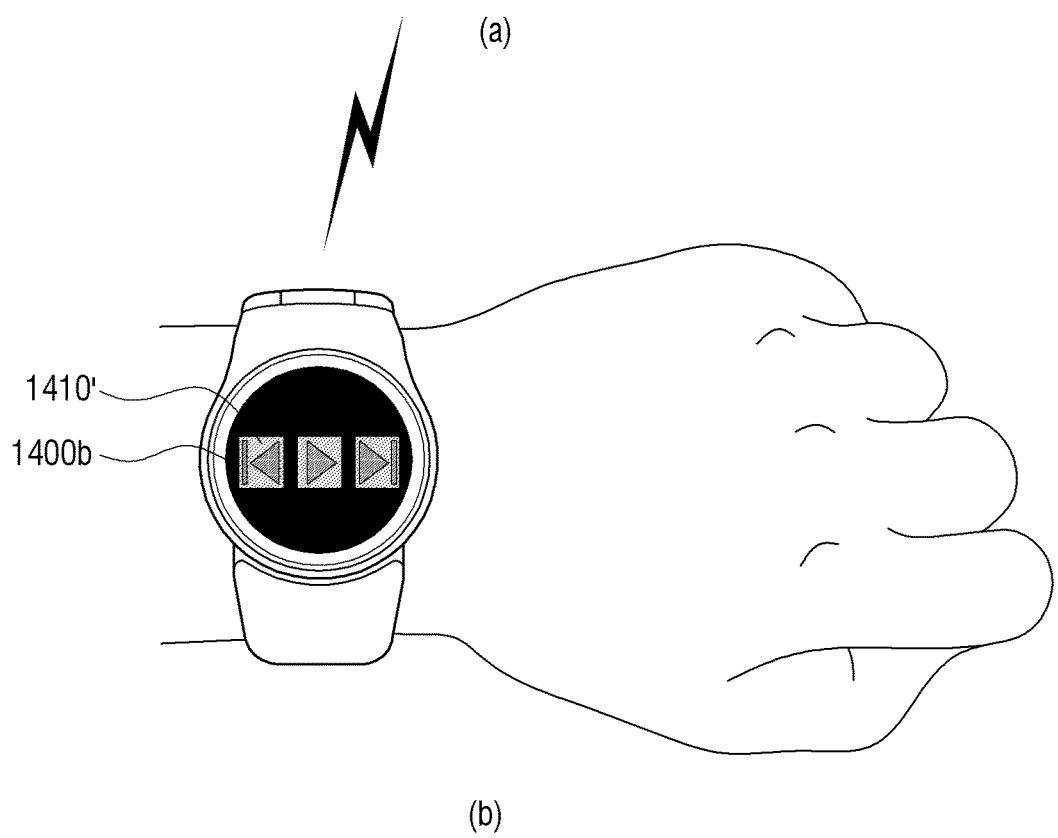
(b)

DISPLAY APPARATUS AND CONTROL METHOD THEREOF

CROSS-REFERENCE TO RELATED APPLICATION(S)

This application claims the benefit under 35 U.S.C. § 119(a) of a Korean patent application filed on Nov. 3, 2016, in the Korean Intellectual Property Office and assigned Serial number 10-2016-0145750, the entire disclosure of which is hereby incorporated by reference.

TECHNICAL FIELD

The present disclosure relates to a display apparatus and a controlling method thereof. More particularly, the present disclosure relates to a display apparatus for displaying an execution screen of an application on a standby screen and a controlling method thereof.

BACKGROUND

Recently, a display apparatus has provided an always-on display service for displaying an execution screen of an application selected by a user on a screen while operating in a standby mode. In other words, when a specific button of a plurality of input buttons is input, or a user command is not input during a predetermined time, a screen of a display apparatus is changed to a monochrome black screen, and the execution screen of the application selected by the user is always displayed on the monochrome black screen.

Through such the always-on display service, the display apparatus may display UIs of clock and calendar widgets, etc. on the monochrome background screen during the standby mode.

However, since the type of widget user interface (UI) which is provided on the monochrome background screen of the display apparatus through the always-on display service is limited, there is a problem that the always-on display service is underutilized.

In addition, the always-on display service results in high power consumption for providing all of the selected widget UIs on the monochrome background screen during the standby mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide increase utilization of an application screen always-on display service (an always-on service) provided by a display apparatus.

In addition, the present disclosure has a purpose of reducing power consumption for using the application screen always-on display service.

In accordance with an aspect of the present disclosure, a display apparatus is provided. The display apparatus includes a display configured to display a screen including a plurality of objects, an input device configured to receive a predefined user command while the screen is displayed, and at least one processor configured to, in response to the predefined user command being input, enter a setting mode for selecting an always-on display object, in response to at least one of the plurality of objects being selected by user input during the setting mode, set a selected object to an always-on display object, and in response to a mode of the display apparatus being changed to a standby mode, control the display to display the selected object on a monochrome background screen.

The at least one processor may be further configured to control the display to display the selected object on an area where the selected object is previously displayed of the monochrome background screen.

The at least one processor, in response to a user command being input to an object displayed on the monochrome background screen while the standby mode is maintained, may further be configured to edit the displayed object according to the user command.

The at least one processor, in response to the at least one of the plurality of objects being selected, may further be configured to control the display to display a menu for setting a display form with respect to the at least one of the plurality of objects.

The selected object may include an updatable object in a widget form, and the at least one processor may further be configured to update the object in the widget form, and controls the display to display the updated object on the monochrome background screen.

The at least one processor, in response to a user command with respect to a displayed object being input while the standby mode is maintained, may further be configured to change the mode of the display apparatus to a normal mode, and control the display to display an execution screen related to the displayed object.

The at least one processor, in response to the predefined user command being input while the standby mode is maintained, may further be configured to remove the displayed object, and control the display to display an unlock screen of the display apparatus.

The display apparatus may further include a sensor for sensing a state of the display apparatus, and the at least one processor may further be configured to remove the selected object from the monochrome background screen if a state of the display apparatus sensed by the sensor is a predetermined state while the standby mode is maintained.

The selected object which is displayed on the monochrome background screen may be displayed in a solid color.

The standby mode may be a mode for displaying a display screen by changing into a monochrome screen by driving the display of the display apparatus with standby power or turning off a power source of the display according to an input user command or a predetermined time.

In accordance with another aspect of the present disclosure, a method of controlling a display apparatus is provided. The method includes displaying a screen including a plurality of objects, in response to a predefined user command being input while the screen is displayed, entering a setting mode for selecting an always-on display object, in response to at least one of the plurality of objects being selected by user input during the setting mode, setting a selected object to an always-on display object, and in response to a mode of the display apparatus being changed to a standby mode, displaying the selected object on a monochrome background screen.

The displaying of the selected object may include displaying the selected object on an area where the selected object is previously displayed of the monochrome background screen.

The method may further include, in response to a user command being input to an object displayed on the monochrome background screen while the standby mode is maintained, editing the displayed object according to the user command.

The setting of the selected object may further include, in response to the at least one of the plurality of objects being selected, displaying a menu for setting a display form with respect to the at least one of the plurality of objects.

The selected object may include an updatable object in a widget form, and the displaying of the selected object may include updating and displaying the object in the widget form.

The method may further include, in response to a user command with respect to a displayed object being input while the standby mode is maintained, changing the mode of the display apparatus to a normal mode and displaying an execution screen related to the displayed object.

The method may further include, in response to the predefined user command being input while the standby mode is maintained, removing an object displayed on the monochrome background screen and displaying an unlock screen of the display apparatus.

The method may further include sensing a state of the display apparatus while the standby mode is maintained, and removing the selected object from the monochrome background screen if a state of the display apparatus is a predetermined state.

The selected object which is displayed on the monochrome background screen may be displayed in a solid color.

The standby mode may be a mode for displaying a display screen by changing into a monochrome screen by driving a display of the display apparatus with standby power or turning off a power source of the display according to an input user command or a predetermined time.

According to various embodiments, a display apparatus according to the present disclosure may increase utilization of an application screen always-on display service (an always-on service) provided by the display apparatus and reduce power consumption for using the application screen always-on display service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a view provided to show generating source information with respect to an always-on widget UI in a display apparatus according to an embodiment of the present disclosure;

FIG. 8A is a first view provided to show editing details of an object set to an always-on display in a display apparatus according to an embodiment of the present disclosure;

FIG. 8B is a second view provided to show editing details of an object set to an always-on display in a display apparatus according to another embodiment of the present disclosure;

FIGS. 9A, 9B and 9C illustrate first views provided to show displaying a selected object as an always-on display in a display apparatus according to an embodiment of the present disclosure;

FIG. 11 is a third view provided to show displaying a selected object as an always-on display in a display apparatus according to another embodiment of the present disclosure;

FIG. 13 is a fifth view provided to show displaying a selected object as an always-on display in a display apparatus according to another embodiment of the present disclosure;

FIG. 17 is a fourth view provided to show editing an object of an always-on widget UI which is displayed on a screen in a display apparatus according to another embodiment of the present disclosure;

FIG. 18 is a fifth view provided to show editing an object of an always-on widget UI which is displayed on a screen in a display apparatus according to another embodiment of the present disclosure;

Throughout the drawings, like reference numerals will be understood to refer to like parts, components, and structures.

DETAILED DESCRIPTION

Figure 1:
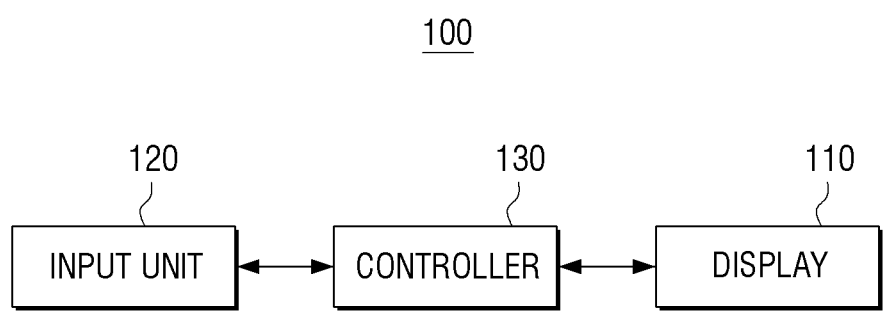
FIG. 1 is a schematic block view illustrating a display apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "first," "second," and so on may be used to describe a variety of elements, but the elements should not be limited by these terms. The terms are used simply to distinguish one element from other elements.

The terms used herein are solely intended to explain a specific embodiment, and not to limit the scope of the present disclosure. The singular forms are intended to include the plural forms as well, unless the context clearly indicates otherwise.

The terms used in the application are merely used to describe particular embodiments, and are not intended to limit the disclosure. Singular forms in the disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an embodiment, 'a module' or 'a unit' performs at least one function or operation, and may be realized as hardware, such as a processor or integrated circuit, software that is executed by a processor, or a combination thereof. In addition, a plurality of 'modules' or a plurality of 'units' may be integrated into at least one module and may be realized as at least one processor except for 'modules' or 'units' that should be realized in a specific hardware.

FIG. 1 is a schematic block view illustrating a display apparatus according to an embodiment of the present disclosure.

Referring to FIG. 1, a display apparatus 100 may be an electronic apparatus such as a smart phone, a smart television (TV), a tablet personal computer (PC), and the like or a wearable device such as a smart watch. Such the display apparatus 100 may include a display 110, an input unit 120 (e.g., an input device) and a controller 130 (e.g., at least one processor).

The display 110 may display a screen including a plurality of objects. The plurality of objects may include at least one of an icon for executing at least one application and elements constituting an execution screen of an executing application. In addition, the executing application may be executed in response to an icon corresponding to a user command being selected, or independently executed without an execution command from a user. An application which is independently executed without a user's execution command may be a widget-related program which provides information such as weather, news, life information, schedule management, clock, memo, and the like.

In addition, the display apparatus 100 may display data related to contents received from an external server such as a contents server (not shown) or pre-stored contents.

Such the display 110 may be embodied as liquid crystal display (LCD), organic light emitting display (OLED), plasma display panel (PDP), or the like. Specifically, the display 110 may be embodied as a touch screen forming an interactive layer structure with a touch input unit 123 included in the input unit 120 for receiving a user command, which is described below.

The input unit 120 may receive a predefined user command for selecting an object for an always-on display, among a plurality of objects which are displayed on the display 110, while the screen including the plurality of objects is displayed.

The controller 130 may control overall operations with respect to a plurality of elements which constitute the display apparatus 100. Specifically, the controller 130 may control a widget generator 12 or an always-on service module 22 to display a widget user interface (UI) on a home screen or display an always-on UI on an always-on service screen.

The controller 130, in response to a predefined user command being input through the input unit 120, may enter a setting mode for selecting an object for an always-on display, among a plurality of objects which are displayed on a screen. In response to a user command being input while the controller 130 enters the setting mode, the controller 130 may set an object which is selected by user input, among the plurality of objects displayed on the screen, to an object for the always-on display.

The controller 130, in response to a mode of the display apparatus 100 being changed to a standby mode, may control the display 110 to display an object which is selected as an always-on display on a black screen. Specifically, the controller 130, in response to an object selected by user input, among a plurality of objects, being set to an object for always-on display, may control the display 110 to display the object for the always-on display on an area corresponding to the area where the object selected by the user input is displayed on a normal mode screen of the black screen.

According to such the control command, the display 110 may display the object selected as the always-on display on the black screen when a mode of the display apparatus 100 is changed to a standby mode. The object which is displayed on the black screen may be displayed in a solid color.

The controller 130, in response to the predefined user command being input while the standby mode is maintained, may remove the object which is displayed on the black screen and control the display 110 to display an unlock screen of the display apparatus 100. According to such the control command, the display 110, in response to the predefined user command being input while the standby mode is maintained, may change a display screen from the black screen to the unlock screen of the display apparatus 100 for displaying.

The normal mode may be a mode where a plurality of objects is displayed on a display screen of the display apparatus 100 since driving power is supplied for driving the display apparatus 100.

The standby mode may be a mode for blocking power to the remaining elements except a specific element, among a plurality of elements which constitute the display apparatus 100, or for supplying low power to at least one element to reduce power consumption of the display apparatus 100.

Therefore, the controller 130 may change a mode of the display apparatus 100 to a standby mode when an input button for changing to the standby mode of input buttons provided in the display apparatus 100 is pressed by a user in the normal mode, or a user input is not input during a predetermined critical time. In response to an operation mode of the display apparatus 100 being changed into a standby mode, the controller 130 may block the supply of power to the display 110. Accordingly, a screen of the display apparatus 100 may be changed to a black screen.

In response to the screen of the display apparatus 100 being changed to the black screen, the controller 130 may supply power to an area where the object for the always-on display is displayed. Accordingly, the display 110 may display the object which is set to the always-on display on the black screen.

In accordance with a further aspect of the present disclosure, the controller 130, in response to at least one of a plurality of objects being selected, may control the display 110 to display a menu for setting a display form with respect to the at least one selected object.

The menu for setting the display form may be a menu for setting at least one of color, size, update information of the at least one selected object. Therefore, a user may set a display form with respect to the object selected by the user through the displayed menu. In response to a setting command being input, the controller 130 may control the display 110 to display at least one object which is selected by the user in a display form corresponding to the input setting command.

Accordingly, the display 110 may display the object selected as the always-on display in a display form corresponding to a user's setting command when the mode of the display apparatus 100 is changed to the standby mode.

The at least one selected object, among a plurality of objects which are displayed on the normal mode screen, may include an updatable object in a widget form. Therefore, the controller 130 may periodically update the selected object in the widget form, and control the display 110 to display the updated object in the widget form on the monochrome background screen during the standby mode.

According to an embodiment, the controller 130 may update an object in a widget form which is selected by a user in accordance with a predefined update interval. According to another embodiment, as described above, the controller 130 may update the object in the widget form which is selected by the user based on a user's setting command which is input through the menu for setting a display form.

Through the various embodiments, the controller 130 may update the object in the widget form which is selected by the user and the display 110 may display the updated object in the widget form on the monochrome background screen during the standby mode.

In accordance with a further aspect of the present disclosure, the controller 130, in response to a user command with respect to an object displayed on a monochrome background screen being input while the standby mode is maintained, according to the input user command, may edit the object which is displayed on the monochrome background screen.

According to an embodiment, the controller 130, in response to a user command for moving the object displayed on the monochrome background screen being input while the standby mode is maintained, may perform editing so that the object may be displayed on a point corresponding to the input user command. The user command for moving the object displayed on the monochrome background screen may be a touch and drag command, and a touch and tap command. Accordingly, the display 110 may display the object displayed on the monochrome background screen by moving the object to the point corresponding to the input user command while the standby mode is maintained.

According to another embodiment, the controller 130, in response to a touch command with respect to the object displayed on the monochrome background screen being input while the standby mode is maintained, may control the display 110 to display a menu for setting a display form of the object in accordance with the input touch command Depending on an embodiment, the controller 130, in response to a touch command with respect to the object displayed on the monochrome background screen being input, may compare a touch input time of the input touch command with a predetermined critical time. As a result of comparison, if the touch input time is longer than the predetermined critical time, the controller 130 may control the display 110 to display a menu for setting a display form of the object in a periphery of the object displayed on the monochrome background screen.

The menu for setting the display form may be a menu for setting at least one of color, size and update information of the object displayed on the monochrome background screen. Therefore, a user may reset a display form of the object through the displayed menu. In response to the setting command being input, the controller 130 may control the display 110 to reset and display the object displayed on the monochrome background screen in a display form corresponding to the input setting command.

Accordingly, the display 110 may display the object of which display form is reset on the monochrome background screen.

In accordance with a further aspect of the present disclosure, the controller 130, in response to the user command with respect to the object displayed on the monochrome background screen being input while the standby mode is maintained, may change a mode of the display apparatus 100 to a normal mode and control the display 110 to display a screen corresponding to the object displayed on the monochrome background screen.

For example, a touch command with respect to the object displayed on the monochrome background screen may be input while the standby mode is maintained, and when the input touch command is input shorter than a predetermined first critical time, the controller 130 may determine that the user command is an execution command with respect to the selected object. Therefore, the controller 130 may change the mode of the display apparatus 100 to the normal mode and control the display 110 to display the screen corresponding to the object displayed on the monochrome background screen.

In accordance with such the control command, the display 110 may display an execution screen corresponding to an object displayed on a standby mode screen by changing the mode of the display apparatus 100 from the standby mode to the normal mode.

In accordance with a further aspect of the present disclosure, the display apparatus 100 may further include a sensor 170 for sensing a state of the display 110, and the sensor 170 may control the display 110 to remove the object displayed on the monochrome background screen from a background screen if a state of the display apparatus 100 which is sensed by the sensor 170 is a predetermined state.

According to an embodiment, the sensor 170 may sense the brightness of surroundings or the motion of the display apparatus 100 when the display apparatus 100 is rotated. For example, a user may put the display apparatus 100 such as a smart phone in a trouser pocket or in a bag, or place the display apparatus 100 upside down so that a display area of the display apparatus 100 faces a table surface. In response to the brightness of surroundings or the state of the display apparatus 100 being sensed by the sensor 170, the controller 130 may determine that a user does not use the display apparatus 100 based on the sensed state information and remove the object displayed on the monochrome background screen. As such, a predetermined event occurs, the controller 130 may maintain the object displayed on the monochrome background screen or remove the object from the screen, thereby reducing power consumption for displaying the object on the monochrome background screen during the standby mode.

The detailed description of the sensor 170 may be made in detail below.

Each element of the display apparatus 100 according to the present disclosure has been schematically described.

Figure 2:
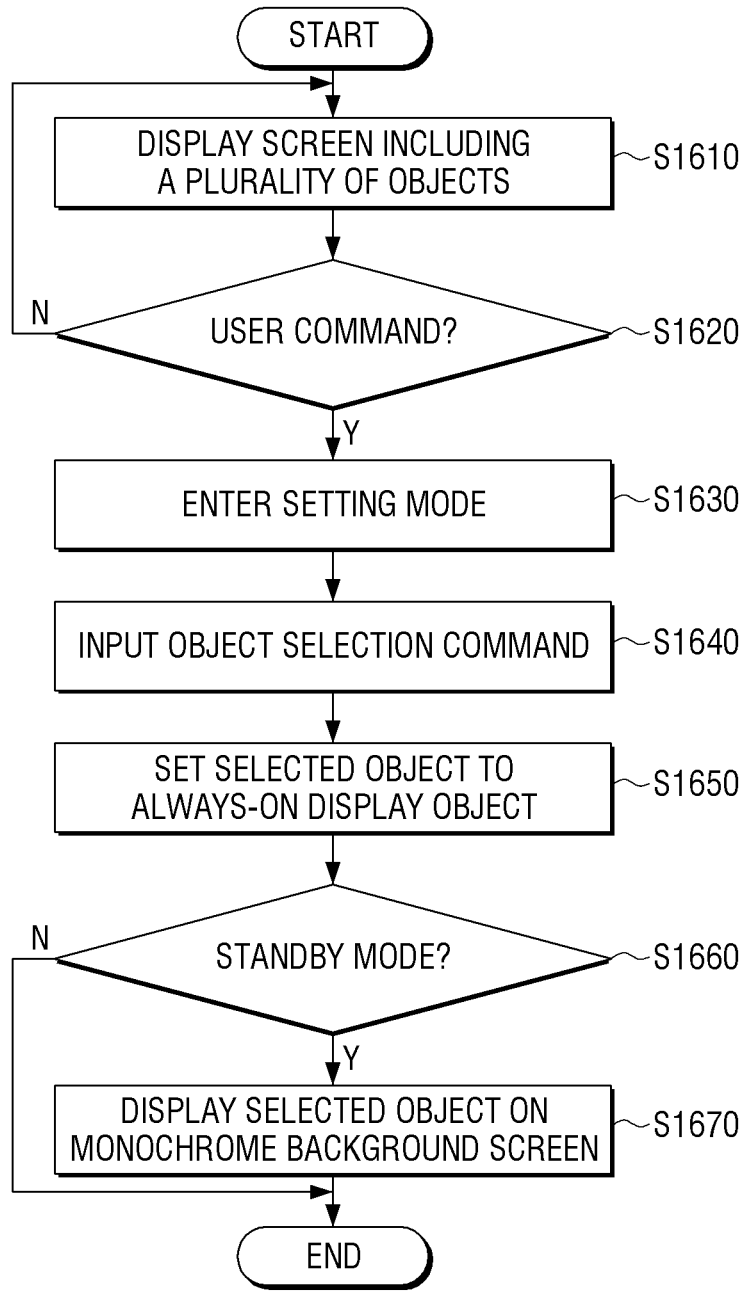
FIG. 2 is a flow chart showing a method of displaying an always-on widget user interface (UI) on a screen with respect to an object set to an always-on display during a standby mode in a display apparatus according to an embodiment of the present disclosure.

FIG. 2 is a flow chart showing a method of displaying an always-on widget UI on a screen with respect to an object set to an always-on display during a standby mode in a display apparatus according to an embodiment of the present disclosure.

Referring to FIG. 2, the display apparatus 100 may display a screen including a plurality of objects in operation S1610. The plurality of objects may include at least one of an icon for executing at least one application and elements constituting an execution screen of an executing application. In addition, the executing application may be executed by selecting an icon corresponding to a user command or independently executed without an execution command from a user. The application which is independently executed without the user's execution command may be a widget-related program which provides information such weather, news, life information, schedule management, clock, memo, etc.

The display apparatus 100, in response to a user command with respect to an object for an always-on display, among a plurality of objects, being input while a screen including the plurality of objects is displayed, may enter a setting mode for selecting the object for the always-on display, among the plurality of objects with are displayed on a screen in operations S1620 and S1630.

The display apparatus 100, in response to the user command being input while entering the setting mode, may set an object selected by user input, among the plurality of objects which are displayed on the screen, to the object for the always-on display in operations S1640 and S1650.

Specifically, in response to at least one object being selected, among the plurality of objects, the display apparatus 100 may display a menu for setting a display form with respect to the at least one selected object.

The menu for setting the display form may be a menu for setting at least one of color, size, update information of the at least one selected object. Therefore, a user may set a display form with respect to the object selected by the user through the displayed menu. In response to the setting command being input, the display apparatus 100 may set the at least one object selected by the user in a display form corresponding to the input setting command to the object for the always-on display.

The display apparatus 100, in response to an operation mode of the display apparatus 100 being changed to a standby mode, may display the object selected as the always-on display on the monochrome background screen in operations S1660 and S1670.

The object which is selected as the always-on display may include an updatable object in a widget form. Therefore, the display apparatus 100 may periodically update the selected object in the widget form and display the updated object in the widget form on the monochrome background screen during the standby mode.

The standby mode may be a mode where a display screen is changed to a monochrome background screen by supplying standby power to a display or blocking the supply of power to the display when a user command is not input during a predetermined time.

In other words, the standby mode may be a mode where the display screen is changed to the monochrome background screen when a user command for turning off the display of the display apparatus 100 is input, or the user command is not input during a predetermined critical time.

Specifically, the display apparatus 100 may display the object selected as the always-on display on an area where the object selected as the always-on display is previously displayed of the monochrome background screen when an object selected by user input, among the plurality of objects, is set to the object for the always-on display.

However, the present disclosure is not limited thereto, but the display apparatus 100 may display the object selected as the always-on display on a display area selected by a user of the monochrome background screen when the object selected by user input, among the plurality of objects, is set to the object for the always-on display.

Hereinafter, a method of updating an object which is set to an always-on display in the display apparatus 100 according to the present disclosure will be described in detail.

Figure 3:
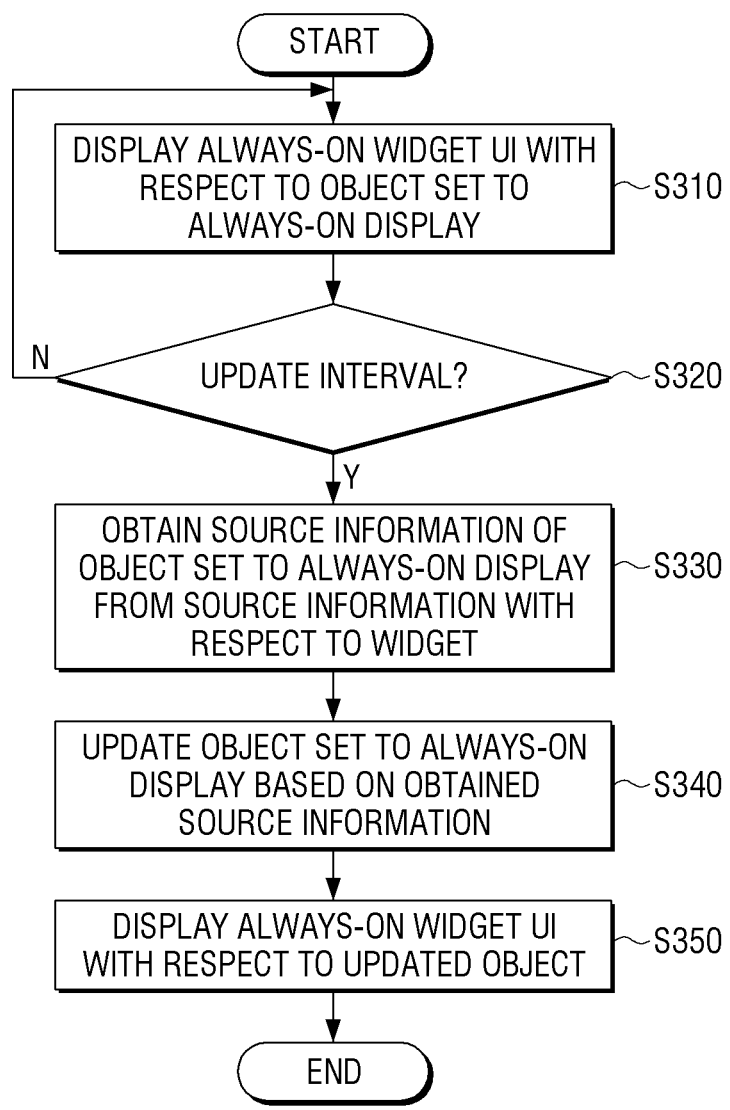
FIG. 3 is a flow chart showing a method of updating an object set to an always-on display in a display apparatus according to an embodiment of the present disclosure.

FIG. 3 is a flow chart showing a method of updating an object set to an always-on display in a display apparatus according to an embodiment of the present disclosure.

Referring to FIG. 3, the display apparatus 100 may display an always-on widget UI with respect to an object set to an always-on display in response to an operation mode of the display apparatus 100 being changed from a normal mode to a standby mode in operation S310.

When the always-on widget UI is displayed, the display apparatus 100 may determine whether a predetermined update interval arrives in operation S320. As a result of determination, if the predetermined update interval does not arrive, the display apparatus 100 may maintain the display of the always-on widget UI which is currently displayed on a screen.

If the predetermined update interval arrives, the display apparatus 100 may obtain source information of the object which is set to the always-on display based on source information of a widget UI related to the always-on widget UI in operation S330. The display apparatus 100 may update the object which is set to the always-on display based on the obtained source information in operation S340. The display apparatus 100 may display the always-on widget UI with respect to the updated object in operation S350.

Hereinafter, an operation for displaying an object selected by a user during a standby mode in the display apparatus 100 according to the present disclosure will be described in detail through various embodiments.

Figure 4:
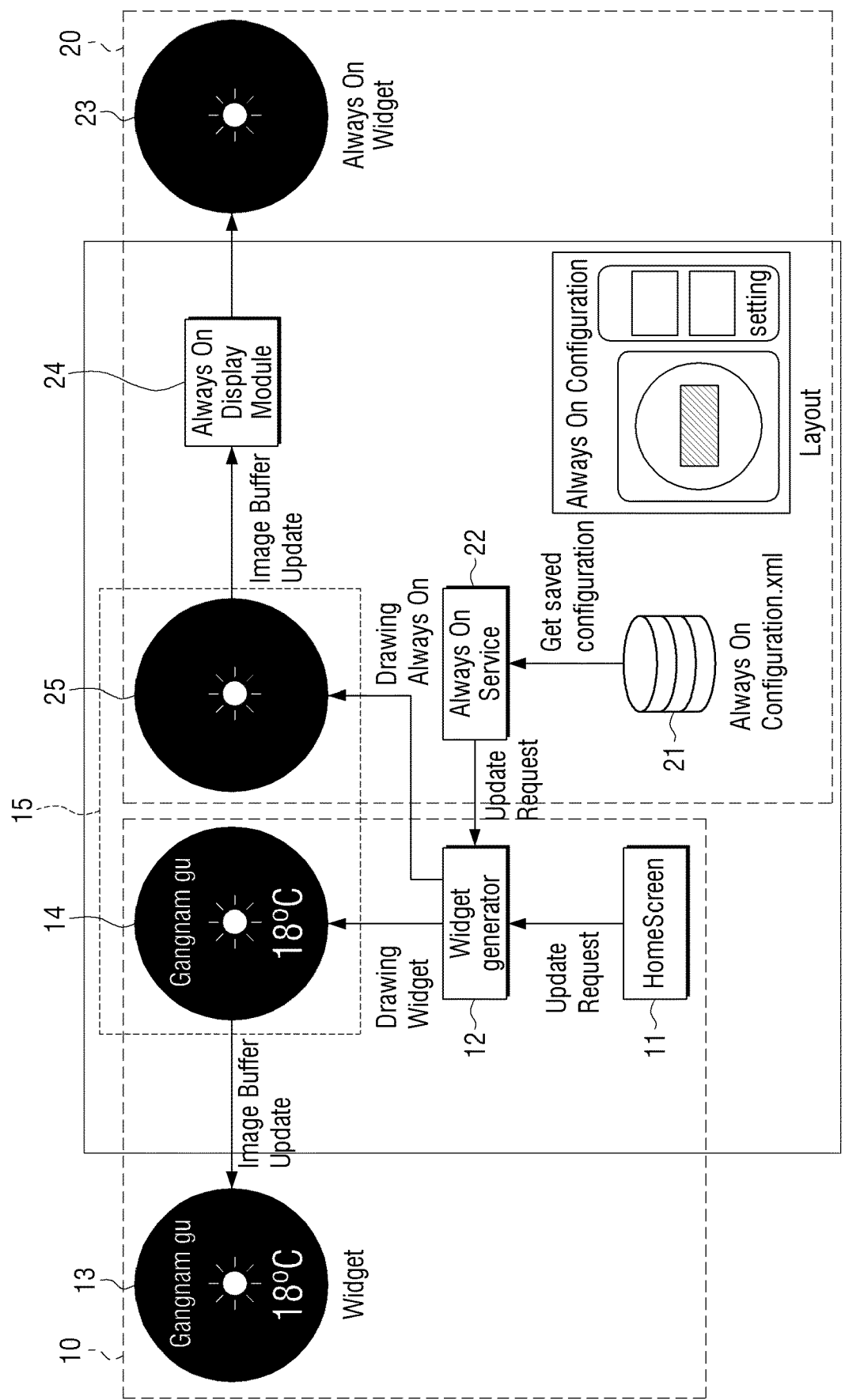
FIG. 4 is a view illustrating an always-on service provided by a display apparatus according to an embodiment of the present disclosure.

FIG. 4 is a view illustrating an always-on service provided by a display apparatus according to an embodiment of the present disclosure.

Referring to FIG. 4, the display apparatus 100 may display a home screen 11 when an operation mode of the display apparatus 100 is a normal mode 10. The home screen 11 may be a screen including at least one of an icon corresponding to each of a plurality of applications and a UI.

When the home screen 11 is displayed, the display apparatus 100 may execute a widget generator 12 for displaying a widget UI on the home screen 11. The widget generator 12 may be a module for generating a widget UI for providing information such as weather, clock, news, life information, etc. Therefore, the widget generator 12 may generate the widget UI for providing information such as weather, clock, news, life information, etc. based on source information related to a pre-stored widget.

The widget generator 12 may receive widget information such as weather, clock, news, life information, etc. from a web server (not shown) which periodically provides widget service and update the widget UI such as weather, clock, news, life information, etc. based on the received widget information.

As shown, the widget generator 12 may generate a weather widget UI 13 based on the source information related to the pre-stored widget. The widget generator 12 may periodically receive widget information related to weather from the web server (not shown) and generate the weather widget UI 13 based on the received widget information.

When the weather widget UI 13 is generated, the display apparatus 100 may display the weather widget UI 13 on the home screen 11.

The display apparatus 100 may update and display the weather widget UI 13 which is displayed on the home screen 11 according to a predetermined update interval.

Specifically, while the weather widget UI 13 is displayed on the home screen 11, the widget generator 12 may receive the widget information related to weather from the web server (not shown) according to the predetermined updated period, generate a weather widget UI 14 based on the received widget information, and temporarily store the generated weather widget UI 14 in an image buffer 15. Accordingly, in the display apparatus 100, the weather widget UI 13 which is currently displayed on the home screen 11 may be changed to the weather widget UI 14 which is temporarily stored in the image buffer 15 for displaying.

While the updated weather widget UI 14 is displayed on the home screen 11, in response to a mode of the display apparatus 100 being changed to a standby mode 20, the display apparatus 100 may provide an always-on service.

The standby mode 20 may be a mode for changing a screen of the display apparatus 100 to a black screen. For example, when an input button for changing the screen to the black screen, among input buttons provided in the display apparatus 100, is pressed by a user, or a user command is not input during a predetermined critical time in a normal mode, the display apparatus 100 may enter the standby mode 20 for changing the screen to the black screen.

In response to the mode of the display apparatus 100 being changed from the normal mode 10 to the standby mode 20, the display apparatus 100 may execute an always-on service mode 22 for displaying the always-on widget UI all the time.

For example, the display apparatus 100 may provide an always-on service with respect to the weather widget UI 14 in the standby mode 20. Specifically, the display apparatus 100 may activate the always-on service module 22 when the mode of the display apparatus 10 is changed to the standby mode 20. Accordingly, the always-on service module 22 may obtain source information 21 for providing a pre-stored always-on service related to weather and transmit the obtained source information 21 to the widget generator 12. Accordingly, the widget generator 12 may generate an always-on widget UI 23 based on widget information received from the web server (not shown) related to the weather widget UI 14 which is most recently updated and the source information 21 received from the always-on service module 22.

When such the always-on widget UI 23 is generated, the display apparatus 100 may execute an always-on display module 24, and the always-on display module 24 may display the always-on widget UI 23 generated from the widget generator 12 on the black screen.

While the always-on widget UI 23 is displayed on the black screen, the always-on service module 22 may check the predetermined update interval, and when the predetermined update interval arrives, ask for updating to a web engine module (not shown). The always-on service module 22 may transmit the source information related to the always-on widget UI 23 which is displayed on the black screen to the widget generator 12.

Upon the update request, the widget generator 12 may be activated and receive the widget information related to weather from the web server (not shown). The widget generator 12 may generate an always-on widget UI 25 based on the widget information related to weather, which is received from the web server (not shown), and the source information related to the always-on widget UI 23 which is displayed on the black screen and temporarily store the always-on widget UI 25 in the image buffer 15.

When the updated always-on widget UI 25 is temporarily stored in the image buffer 15, the always-on display module 24 may update the always-on widget UI 23 which is currently displayed on the black screen to the always-on widget UI 25 which is temporarily stored in the image buffer 15 for displaying, thereby providing an always-on service.

Figure 5:
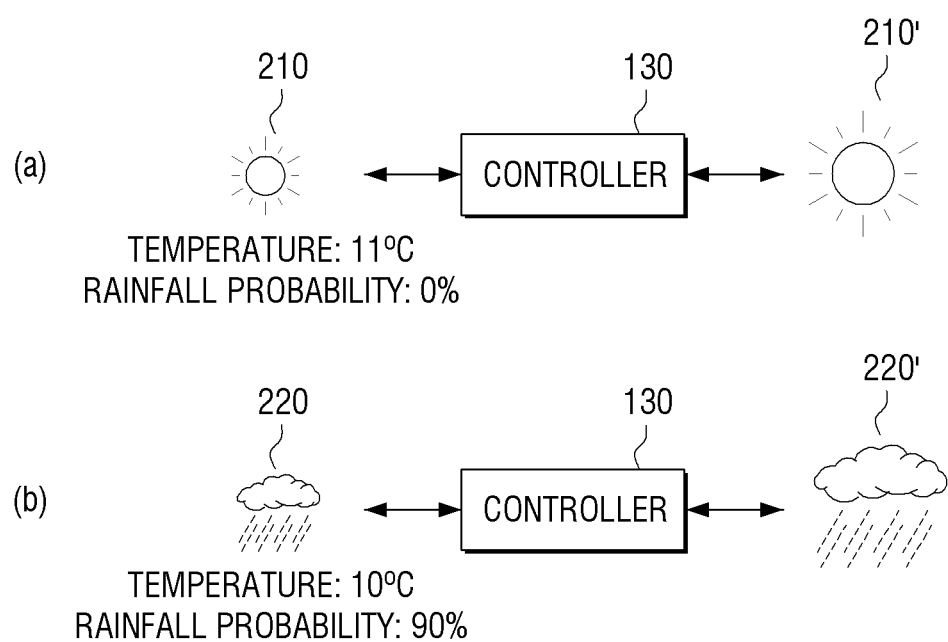
FIG. 5 is a view provided to show updating and displaying an object selected as an always-on display in a display apparatus according to an embodiment of the present disclosure.

FIG. 5 is a view provided to show updating and displaying an object selected as an always-on display in a display apparatus according to an embodiment of the present disclosure.

As shown in part (a) of FIG. 5, the display apparatus 100 may display at least one of an icon or a UI corresponding to each of a plurality of applications during a normal mode. While the at least one of the icon and UI corresponding to each of the plurality of applications is displayed, the display apparatus 100 may receive a user command for always-on display of a UI of a currently executing application related to weather (hereinafter, referred to as a weather widget UI 210.

In response to the user command being input, the controller 130 may set an object corresponding to the user command, among a plurality of objects included in the weather widget UI 210, to an object for the always-on display. That is, the controller 130 may set a 'sun' image corresponding to the user command, among the plurality of objects included in the weather widget UI 210, to the object for the always-on display.

Therefore, the display 110 may display an object 210' related to the 'sun' image which is set to the always-on display on a monochrome background screen (hereinafter, referred to as always-on screen) in response to a mode of the display apparatus 100 being changed to a standby mode.

The controller 130 may change the object set to the always-on display with reference to weather information updated by a periodically executing application related to weather during the standby mode.

For example, when a state of the weather is changed from sunny to rainy through the updated weather information, the controller 130 may change a weather widget UI 220 based on the updated weather information. Accordingly, the display 110 may display the weather widget UI 220 which indicates rainy weather based on the updated weather information during the normal mode.

The controller 130 may change the object for the always-on display with a 'rainy' image included in the weather widget UI 220 which indicates the rainy weather based on the updated weather information.

Accordingly, as shown in part (b) of FIG. 5, the display 110 may display an always-on widget UI with respect to an object 220' related to the rainy image which is changed from the object 210' related to the sunny image on the black screen during the standby image.

The controller 130 may update the object selected as the always-on display based on the update information of the widget UI related to the object selected as the always-on display, and the display 110 may display an always-on widget UI related to the updated object on the black screen.

Figure 6A:
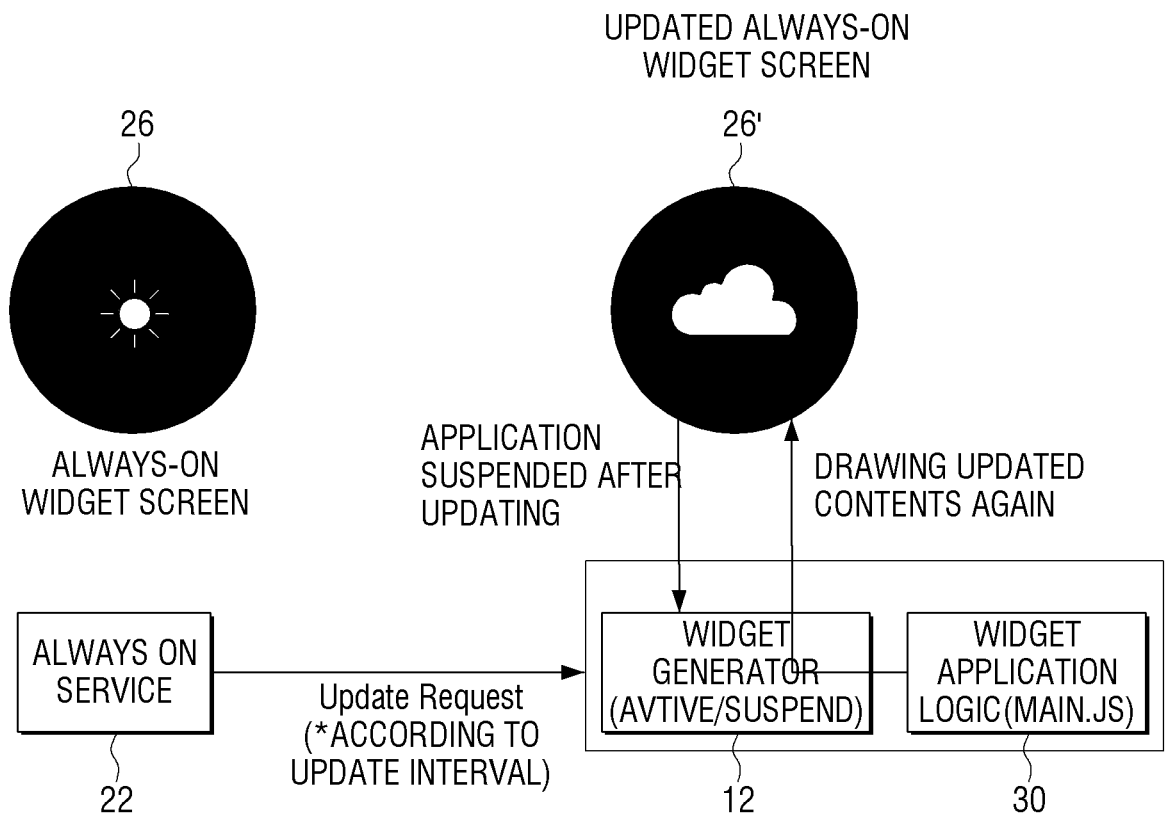
FIG. 6A is a first view provided to show displaying an always-on widget UI which is updated in a display apparatus according to an embodiment of the present disclosure.

FIG. 6A is a first view provided to show displaying an always-on widget UI which is updated in a display apparatus according to an embodiment of the present disclosure.

Referring to FIG. 6A, the display apparatus 100 may display an always-on widget UI 26 which is set to an always-on display on a black screen when a mode of the display apparatus 100 is changed to a standby mode. While the always-on widget UI 26 is displayed, the always-on service module 22 may determine whether a predetermined update interval arrives. As a result of determination, when the predetermined update interval arrives, the always-on service module 22 may request the widget generator 12 to update the always-on widget UI 26. In accordance with the update request, the widget generator 12 and a weather widget application 30 may be activated. In response to the weather widget application 30 being activated, the display apparatus 100 may receive the widget information related to weather from the web server (not shown) through the weather widget application 30. In response to the widget information related to weather being received, the web engine module (not shown) may generate an always-on widget UI 26' related to weather, which is predetermined as an always-on display, based on the received widget information related to weather and temporarily store the always-on widget UI 26' related to weather in the image buffer 15.

Accordingly, the display apparatus 100 may update the always-on widget UI 26 displayed on the black screen to the always-on widget UI 26' temporarily stored in the image buffer 15 for displaying.

When the always-on widget UI 26' is temporarily stored in the image buffer 15, the display apparatus 100 may inactivate the pre-activated web engine module (not shown) and the weather widget application 30. That is, the display apparatus 100 may activate the widget generator 12 and the weather widget application 30 only when a period for updating the always-on widget UI 26 displayed in the standby mode arrives, and when the always-on widget UI 26' for updating is generated, the activated widget generator 12 and the weather widget application 30 may be inactivated, thereby solving the problem of data loading in data processing.

Figure 6B:
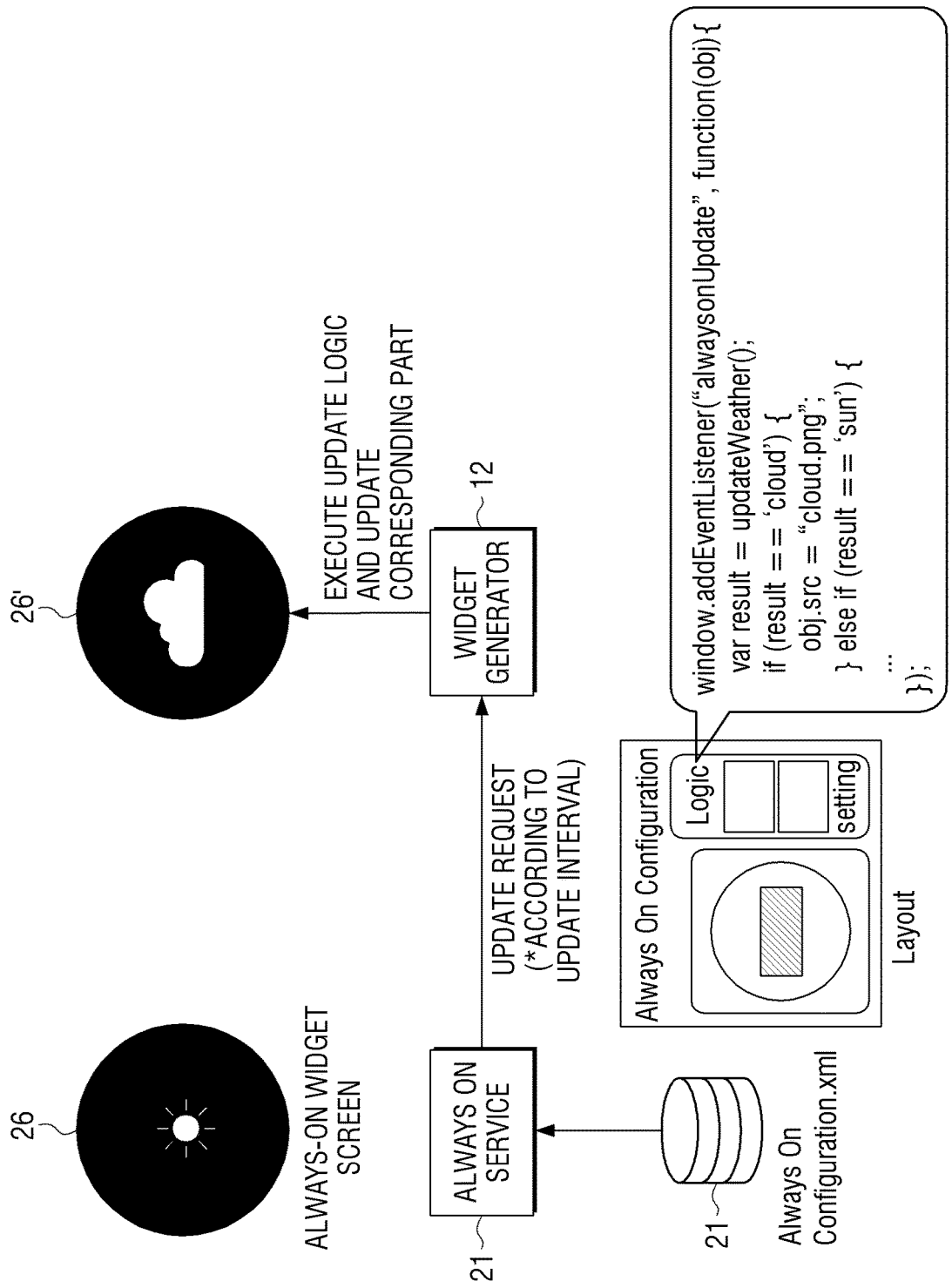
FIG. 6B is a second view provided to show displaying an always-on widget UI which is updated in a display apparatus according to another embodiment of the present disclosure.

FIG. 6B is a second view provided to show displaying an always-on widget UI which is updated in a display apparatus according to another embodiment of the present disclosure.

Referring to FIG. 6B, the display apparatus 100 may display the always-on widget UI 26 which is set to the always-on display on the black screen when the mode of the display apparatus 100 is changed to the standby mode. While the always-on widget UI 26 is displayed, the always-on service module 22 may determine whether the predetermined update interval arrives. As a result of determination, when the predetermined update interval arrives, the always-on service module 22 may request the widget generator 12 to update the always-on widget UI 26. The always-on service module 22 may transmit update request information including source information of the always-on widget UI 26 related to weather, which is displayed on the black screen, to the widget generator 12.

In other words, the always-on service module 22 may transmit update request information including source information (layout information, color information, etc.) with respect to the object to be displayed as the always-on widget UI 26 related to weather, which is displayed on the black screen, to the widget generator 12.

In response to the update information being received, the widget generator 12 may be activated, and the activated widget generator 12 may receive only widget information related to the source information of the always-on widget UI 23 of the widget information related to weather from the web server (not shown) based on the source information included in the received updated information. The widget generator 12 may generate the always-on widget UI 26' based on the source information included in the updated information and the widget information received from the web server (now shown) and temporarily store the always-on widget UI 26' in the image buffer 15.

Accordingly, the display apparatus 100 may update the always-on widget UI 26 displayed on the black screen to the always-on widget UI 26' temporarily stored in the image buffer 15 for displaying.

When the always-on widget UI 26' is temporarily stored in the image buffer 15, the display apparatus 100 may inactivate the pre-activated web engine module 12. That is, the display apparatus 100 may activate the widget generator 12 only when a period for updating the always-on widget UI 26 displayed in the standby mode arrives, and when the always-on widget UI 26' for updating is generated, the display apparatus 100 may inactivate the activated widget generator 12, thereby solving the problem of data loading and unnecessary battery consumption in data processing.

FIG. 7 is a view provided to show generating source information with respect to an always-on widget UI in a display apparatus according to an embodiment of the present disclosure.

The display apparatus 100 may be a wearable device such as a smart watch. In this case, the display apparatus 100 may display a weather widget UI 810 on an execution screen 800-1 as shown in part (a) of FIG. 7.

In other words, the display apparatus 100 may display the weather widget UI 810 including objects representing time, region, weather and temperature based on illustrated source information 800-1'.

A user may touch the execution screen 800-1 on which the weather widget UI 810 is displayed for a predetermined critical time or push an input button 811 provided on one side of the display apparatus 100 in the state where the weather widget UI 810 is displayed on the execution screen 800-1.

When such event occurs, the display apparatus 100 may determine that a user command for always-on display of the weather widget UI 810 is input. Therefore, the display apparatus 100 may display an edit screen 800-2 for editing the weather widget UI 810 as shown in part (b) of FIG. 7.

In other words, the display apparatus 100 may display selection areas 821 to 823 which designate an object representing a region, an object representing weather and an object representing temperature, respectively, on the edit screen 800-2.

The display apparatus 100 may form a rendering tree 800-2' for the object representing a region, the object representing weather and the object representing temperature with reference to the source information 800-1' with respect to the weather widget UI 810.

While the edit screen 800-2 is displayed, in response to a first area 822 for designating the object representing weather being selected, the display apparatus 100 may set the object representing weather corresponding to the selected first area 822 to an object for the always-on display.

When the mode of the display apparatus 100 is changed to the standby mode, as shown in part (c) of FIG. 7, the display apparatus 100 may display the always-on widget UI with respect to an object 831 representing weather set to the always-on display on a black screen 800-3.

When the object representing weather in (b) of FIG. 7 is set to the object for the always-on display, the display apparatus 100 may select a node with respect to the object related to weather corresponding to the pre-selected first area 822 on the rendering tree 800-2'.

The display apparatus 100 may restructure a rendering tree 800-3' based on the node related to weather, which is set to the always-on display. The display apparatus 100 may store layout information for displaying the always-on widget UI with respect to the object related to weather, which is set to the always-on display, on the black screen 800-3 based on the restructured rendering tree 800-3'.

The display apparatus 100 may periodically monitor source information related to the weather widget UI 810 including the objects which represent time, region, weather and temperature and determine whether information of the object related to weather, which is set to the always-on display, is updated or not. As a result of determination, when the information of the object related to weather is updated, the display apparatus 100 may update the layout information with respect to the object related to weather, which is set to the always-on display, the layout information being pre-stored, based on the updated information with respect to the object related to weather.

Therefore, in response to the mode of the display apparatus 100 being changed from the normal mode to the standby mode, the display apparatus 100 may display the always-on widget UI with respect to the object related to weather, which is set to the always-on display, on the black screen based on the updated and stored layout information.

FIG. 8A is a first view provided to show editing details of an object set to an always-on display in a display apparatus according to an embodiment of the present disclosure.

As described above, the display apparatus 100 may be a wearable device such as a smart watch. The weather widget UI may be displayed on the execution screen of the display apparatus 100.

In response to a user command for the always-on display of the widget UI being input while the widget UI is displayed, the display apparatus 100 may convert a screen to an edit screen 900 as shown in part (a) of FIG. 8A. The display apparatus 100 may display an area for designating each of a plurality of objects constituting the weather widget UI on the edit screen 900 with reference to the source information of the widget UI.

Therefore, a user may select at least one of areas for designating objects constituting the weather widget UI displayed on the edit screen 900. According to a selection command of the user, when an area for designating the object 810 representing a weather image of the plurality of objects which constitute the widget UI is selected, the display apparatus 100 may display a sub-edit screen 900-1 for editing the weather image as shown in part (b) of FIG. 8A.

The sub-edit screen 900-1 may include a first menu 920 for setting color of the weather image and a second menu 930 for setting an update interval for updating the weather image. However, the present disclosure is not limited thereto, but the sub-edit screen 900-1 may further include a menu such as a size of the weather image, a tool for changing the weather image, etc.

In response to the first menu 920 for setting the color of the weather image being selected while the sub-edit screen 900-1 is displayed, the display apparatus 100 may display a color setting screen 900-2 including a plurality of colors as shown in part (c) of FIG. 8A.

After one of the plurality of colors included in the color setting screen 900-2 is selected, in response to a user command related to exiting an edit mode being input, the display apparatus 100 may change a color of an object 910' with respect to the weather image set to the always-on display to a color corresponding to the user's selection command as shown in part (d) of FIG. 8A. The display apparatus 100 may display the always-on widget UI with respect to the object 910' of which color is changed to the color corresponding to the user's selection command on a black screen 900'.

FIG. 8B is a second view provided to show editing details of an object set to an always-on display in a display apparatus according to another embodiment of the present disclosure.

As shown in FIG. 8A, in response to a user command for the always-on display of the widget UI being input while the widget UI is displayed, the display apparatus 100 may change a screen to the edit screen 900 as shown in part (a) of FIG. 8B. The display apparatus 100 may display the areas for designating objects constituting the weather widget UI on the edit screen 900 with reference to the source information of the widget UI.

Therefore, a user may select at least one of the areas for designating the plurality of objects constituting the weather widget UI, which is displayed on the edit screen 900. According to a user's selection command, in response to an area for designating the object representing the weather image of the plurality of objects constituting the widget UI being selected, the display apparatus 100 may display the sub-edit screen 900-1 for editing the weather image as shown in part (b) of FIG. 8B.

The sub-edit screen 900-1 may include the first menu 920 for setting the color of the weather image and the second menu 930 for setting the update interval for updating the weather image. However, the present disclosure is not limited thereto, but the sub-edit screen 900-1 may further include a menu such as a size of the weather image, a tool for changing the weather image, etc.

In response to the second menu 930 for setting the update interval being elected while the sub-edit screen 900-1 is displayed, the display apparatus 100 may display an update interval setting screen 900-3 for presenting an update time as shown in part (c) of FIG. 8B.

After the update time is selected through the update interval setting screen 900-3, in response to the user command related to exiting the edit mode being input, the display apparatus 10 may display the always-on widget UI with respect to the object 910' related to the weather image, which is set to the always-on display, on the black screen 900' as shown in part (d) of FIG. 8B.

In addition, the display apparatus 100 may change the weather image set to the always-on display with reference to the weather information updated by an application related to the weather widget UI based on the selected update time and display the always-on widget UI with respect to the object 910' representing the changed weather image on the black screen 900'.

As described above, in response to the update time being selected while the update interval setting screen 900-3 is displayed, the display apparatus 100 may display a warning of battery level according to the selected time. For example, the display apparatus 100 may instantly provide the warning of the battery level when the update time selected by the user is earlier than the predetermined critical time.

For another example, the display apparatus 100 may instantly provide the warning of the battery level by indicating a different color for every update time which is displayed on the update interval setting screen 900-3. For example, the battery level may be visually provided in a blue color on an area where the update time of 90 sec is displayed, the battery level may be visually provided in a yellow color on an area where the update time of 60 sec is displayed, and the battery level may be visually provided in a red color on an area where the update time of 30 sec is displayed.

The display apparatus 100 may set a color of the weather image set to the always-on display and an update interval according to a user's edit command.

As in the description of FIG. 8A, after at least one of a plurality of colors included in the color setting screen 900-2 is selected and a user command for additional editing is input, the display apparatus 100 may return to the sub-edit screen 900-1 described above.

In response to the second menu 930 for setting an update interval being selected, the display apparatus 100 may display the update interval setting screen 900-3 as shown in FIG. 8B. After an update time is selected through the update interval setting screen 900-3, in response to the user command related to exiting the edit mode being input, the display apparatus 100 may change the color of the object 910' with respect to the weather image set to the always-on display to the color corresponding to the user's selection command as shown in (d) of FIG. 8A or 8B, and display the always-on widget UI related to the object 900' of which color is changed on the black screen 900'.

In addition, the display apparatus 100 may change the weather image set to the always-on display with reference to the weather information which is updated through the application related to the weather widget UI based on the selected update time and display the always-on widget UI with respect to the object 910' which represents the changed weather image on the black screen 900'.

Figure 8C:
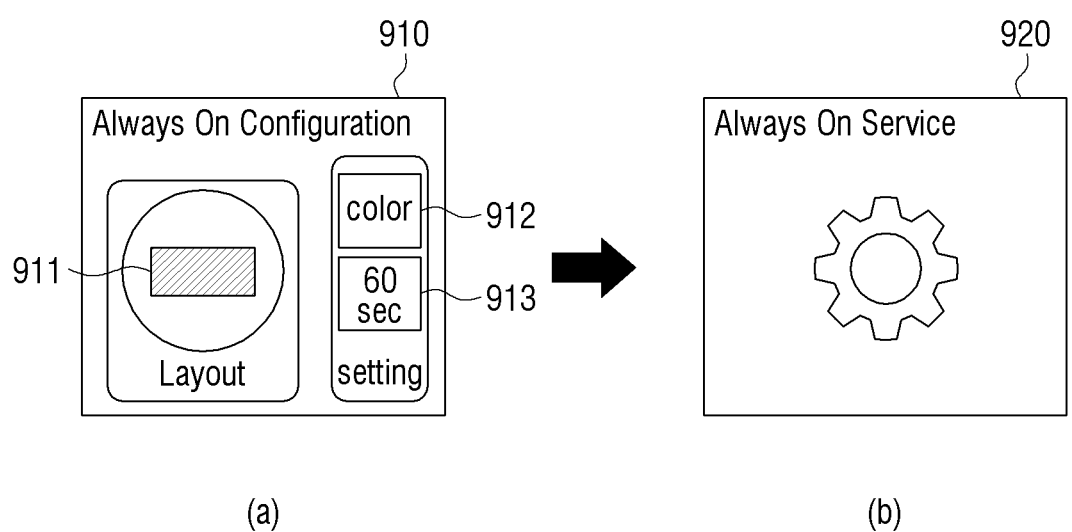
FIG. 8C is a view provided to show setting edit information with respect to an object which is set to an always-on display in a display apparatus according to an embodiment of the present disclosure.

FIG. 8C is a view provided to show setting edit information with respect to an object which is set to an always-on display in a display apparatus according to an embodiment of the present disclosure.

As described in FIGS. 8A and 8B, an area for designating an object representing a weather image may be selected, among the areas for designating objects constituting the weather widget UI displayed on the edit screen 900.

In addition, a color of the weather image and an interval for updating the weather image may be set on the sub-edit screen 900-1.

As such, a setting for displaying the always-on widget UI with respect to the object representing the weather image set to the always-on display related to the weather widget UI on the black screen is completed, the display apparatus 100 may store setting information of the object related to the weather image set to the always-on display as shown in part (a) of FIG. 8C.

In other words, the display apparatus 100 may store always-on setting information 910 including area information 911 with respect to an object selected among a plurality of objects constituting the weather widget UI, color information 912 of the object and interval information 913 for updating. In response to the always-on setting information 910 with respect to the weather widget UI being stored, the display apparatus 100 may generate the setting icon 920 indicating that the always-on service of the weather widget UI is set and display the setting icon 920 on the screen as shown in part (b) of FIG. 8C.

Therefore, a user may receive the always-on service related to the weather widget UI or edit the weather image set to the always-on display related to the weather widget UI by selecting the setting icon 920 displayed on the screen.

Figure 9A:
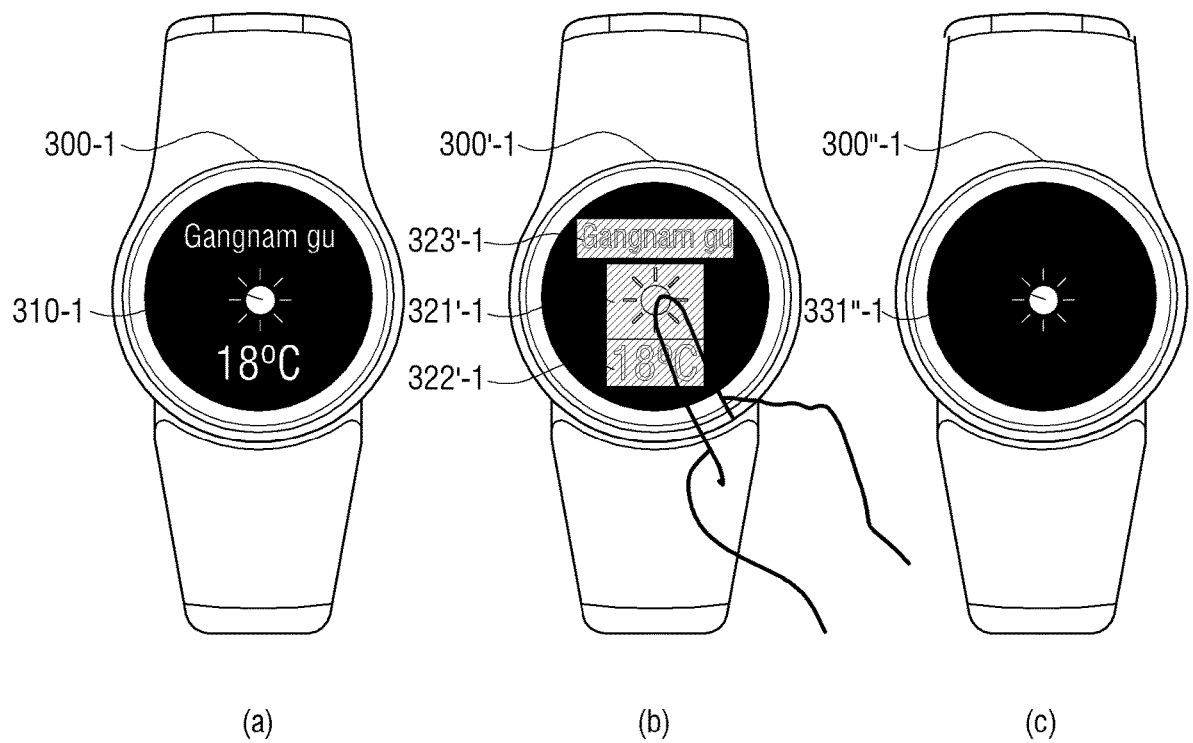

FIGS. 9A to 9C are first views provided to show displaying a selected object as an always-on display in a display apparatus according to an embodiment of the present disclosure.

As shown in FIG. 9A, the display apparatus 100 may be a wearable device such as a smart watch. The display apparatus 100 may display a weather widget UI 310-1 on an execution screen 300-1 as shown in part (a) of FIG. 9A.

While the weather widget UI 310-1 is displayed, the display apparatus 100 may receive a user command for the always-on display of the weather widget UI 310-1. According to an embodiment, the display apparatus 100, in response to a user's touch command being input while the weather widget UI 310-1 is displayed, may determine whether the touch command is input longer than the predetermined critical time and whether the user's touch command is a user command for the always-on display.

However, the present disclosure is not limited thereto, and the display apparatus 100 may determine that a user command for the always-on display of the weather widget UI 310-1 is input in response to an operation button (not shown) provided in the display apparatus 100 being input while the weather widget UI 310-1 is displayed.

Through the embodiment, if it is determined that the user command for the always-on display of the weather widget UI 310-1 is input, the display apparatus 100 may change a screen to an edit screen 300'-1 as shown in part (b) of FIG. 9A. The display apparatus 100 may display first, second and third selection areas 321'-1, 322'-1 and 323'-1 which designate a plurality of objects which constitute the weather widget UNI 310-1 on the edit screen 300'-1 with reference to the source information of the pre-stored weather widget UI 310-1.

In other words, the display apparatus 100 may display the first selection area 321'-1 for designating an object representing weather, the second selection area 322'-1 for designating an object representing temperature and the third selection area 323'-1 for designating an object representing region, among the plurality of objects which constitute the weather widget UI 310-1, on the edit screen 300'-1 with reference to the source information of the weather widget UI 310-1.

However, the present disclosure is not limited thereto, but if it is determined that a user command for the always-on display of the weather widget UI 810 is input, the display apparatus 100 may display an area for designating each of the plurality of objects constituting the weather widget UI 310-1 on the execution screen 300-1.

In response to a selection command with respect to the first selection area 321'-1 for designating an object representing weather, the display apparatus 100 may set the object representing the selected weather to the object for the always-on display.

When the mode of the display apparatus 100 is changed to the standby mode, the display apparatus 100 may display the always-on widget UI with respect to an object 331"-1 representing weather set to the always-on display on a black screen 300"-1 as shown in part (c) of FIG. 9A.

FIG. 9B is a view provided to explain displaying an object selected by a user as an always-on display in the display apparatus 100 in the case the display apparatus 100 is a portable terminal device such as a smartphone.

As shown in part (a) of FIG. 9B, the display apparatus 100, which is a portable terminal device such as a smart phone, may display a screen (hereinafter, referred to as a home screen) 300-2 including at least one of an icon and a widget UI 310-2 which correspond to each of a plurality of applications during a normal mode. The widget UI 310-2 may include objects representing clock and weather. In response to the home screen 300-2 being displayed, the display apparatus 100 may receive a user command for the always-on display.

In response to the user command being input, the display apparatus 100 may display an edit screen 300'-2 with respect to the home screen 300-2 as shown in part (b) of FIG. 9B. The display apparatus 100 may display first and second selection areas 321'-2 and 322'-2 for designating objects each representing clock and weather, which constitute the widget UI 310-2 displayed on the home screen 300-2, on the edit screen 300'-2.

In other words, the display apparatus 100 may display the first selection area 321'-2 for designating an object representing the clock and the second selection area 322'-2 for designating an object representing the weather, among a plurality of objects constituting the widget UI 310-2 with reference to the source information of the widget UI 310-2, on the edit screen 300'-2.

In response to a selection command with respect to the first selection area 321'-2 being input while the edit screen 300'-2 is displayed, the display apparatus 100 may set an object representing a designated time to the first selection area 321'-2 to the object for the always-on display.

In response to the mode of the display apparatus 100 being changed to the standby mode, the display apparatus 100 may display the always-on widget UI with respect to an object 330"-2 representing the clock set to the always-on display on a black screen 300"-2 as shown in part (c) of FIG. 9B.

The display apparatus 100 may determine whether an edit command for a time object previously selected by a user is input before displaying the always-on widget UI with respect to the object 330"-2 representing the time set to the always-on display on the black screen 300"-2. If the edit command related to the time object is not input, the display apparatus 100 may display the always-on widget UI with respect to a time object 330"-2 set to the always-on display on an area corresponding to the area where the time object is displayed of the home screen 300-2 on the black screen 300"-2.

FIG. 9C is a view provided to explain displaying an object selected by a user as an always-on display in the display apparatus 100 in the case where the display apparatus 100 is an electronic device such as a smart TV.

As shown in part (a) of FIG. 9C, the display apparatus 100, which is an electronic device such as a smart TV, may display an execution screen 300-3 including menu icons corresponding to a plurality of applications and a stock-related widget UI. The display apparatus 100 may receive a user command for the always-on display while the execution screen 300-3 is displayed.

In response to the user command for the always-on display being input, as shown in part (b) of FIG. 9C, the display apparatus 100 may display an edit screen 300'-3 with respect to the execution screen 300-3. The display apparatus 100 may display first and second selection areas 321'-3 and 322'-3 for designating objects representing stock increase/decrease rates and stock trading amounts constituting the widget UI related to stock, which is displayed on the execution screen 300-3, on an execution screen 300'-3.

In other words, the display apparatus 100 may display the first selection area 321'-3 for designating an object representing the stock increase/decrease rates and the second selection area 322'-3 for designating an object representing the stock trading amounts, among a plurality of objects constituting the stock-related widget UI, on the edit screen 300'-3 with reference to source information of the stock-related widget UI.

In response to a selection command with respect to the first and second selection areas 321'-3 and 322'-3 being input while the execution screen 300'-3 is displayed, the display apparatus 100 may set an object indicating the stock increase/decrease rates designated on the first selection area 321'-3 and an object indicating the stock trading amounts designated on the second selection area 322'-3 to the object for the always-on display.

In response to the mode of the display apparatus 100 being changed to the standby mode, as shown in part (c) of FIG. 9C, the display apparatus 100 may display the always-on widget UI of an object 330"-3 representing the stock increase/decrease rates and the stock trading amounts, which are set to the always-on display, on a black screen 300"-3.

Figure 10:
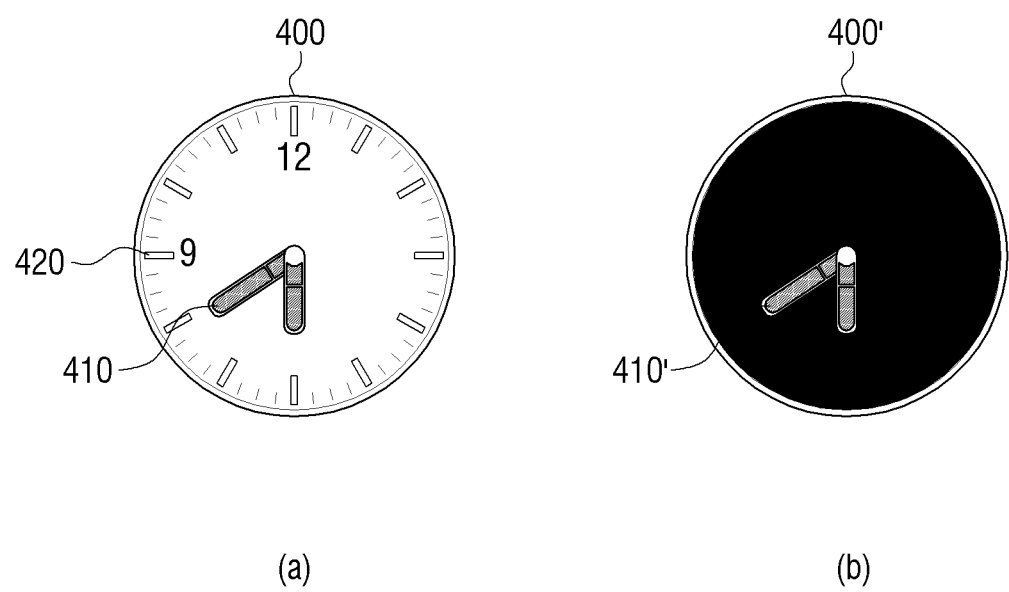
FIG. 10 is a second view provided to show displaying a selected object as an always-on display in a display apparatus according to another embodiment of the present disclosure.

FIG. 10 is a second view provided to show displaying a selected object as an always-on display in a display apparatus according to another embodiment of the present disclosure.

As shown in part (a) of FIG. 10, the display apparatus 100 may be a wearable device such as a smart watch. The display apparatus 100 may display a clock UI 400 on a screen. While the clock UI 400 is displayed, the display apparatus 100 may receive a user command for displaying the clock UI 400 as the always-on display.

For example, the clock UI 400 displayed on the screen may be a UI in a form of analog clock and include an object 410 indicating hours and a scale object 420 indicating hours and minutes. While the clock UI 400 is displayed, a user may select the object 410 indicating time, among a plurality of objects included in the clock UI 410. When the object 410 indicating time is selected, the display apparatus 100 may set the object 410 indicating the selected time to the object for the always-on display.

As shown in part (b) of FIG. 10, the display apparatus 100 may display the always-on widget UI with respect to an object 410' indicating the selected time, which is set to the always-on display, on a black screen 400' during the standby mode.

The display apparatus 100 may determine whether an edit command for the object 410 indicating the time previously selected by a user is input before displaying the always-on widget UI with respect to the object 410' indicating the time, which is set to the always-on display, on the black screen 400'. If the edit command is not input, the display apparatus 100 may set a color of the object 410' indicating the time of the always-on display to a predefined solid color and display the always-on widget UI with respect to the object 410' set to the predefined solid color on the black screen 400'.

FIG. 11 is a third view provided to show displaying a selected object as an always-on display in a display apparatus according to another embodiment of the present disclosure.

As shown in part (a) of FIG. 11, the display apparatus 100 may be an electronic device such as a smart TV. The display apparatus 100 may display a smart home service UI 500 for controlling a plurality of peripheral devices capable of wireless communication and providing operation states thereof on a screen. While the smart home service UI 500 is displayed, the display apparatus 100 may receive a user command for always-on display of the displaying smart home service UI 500.

For example, the smart home service UI 500 displayed on the screen may include control UIs 510 to 550 for controlling peripheral devices corresponding a refrigerator 510, an air conditioner 520, a washing machine 530, a robot cleaner 540, and an audio video (AV) 550 which are capable of wireless communication.

While the smart home service UI 500 including the control UIs 510 to 550 is displayed, second and third objects 532 and 533 may be selected, among first, second, third objects 531, 532 and 533 included in a washing machine-related control UI 530, of the control UIs 510 to 550 included in the smart home service UI 510. The first object 531 may be for controlling an operation of a washing machine, the second object 532 may indicate the remaining time of an entire washing time of the washing machine, and the third object 533 may indicate the remaining time for rinsing.

In response to the second and third objects 532 and 533 included in the washing machine-related control UI 530 being selected, the display apparatus 100 may set the second object 532 indicating the remaining time of the entire washing time of the washing machine and the third object 533 indicating the remaining time for rinsing to an object 530' for the always-on display.

As shown in part (b) of FIG. 11, the display apparatus 100 may display the always-on widget UI with respect to the object 530' including the second object 532 indicating the remaining time of the entire washing time of the washing machine and the third object 533 indicating the remaining time for rinsing, which is set to the always-on display, on a black screen 500' during the standby mode.

The display may determine whether an edit command with respect to the second and third objects 532 and 533 which previously selected by a user is input before displaying the always-on widget UI with respect to the object 530' including the second and third objects 532 and 533, which is set to the always-on display, on the black screen 500'. If the edit command is not input, the display apparatus 100 may set a color of each of the second and third objects 532 and 533 of the always-on display to a predefined solid color. The display apparatus 100 may display the always-on widget UI with respect to the object 530' including the second and third objects 532 and 533 set in a predefined solid color on the black screen 500'.

Figure 12:
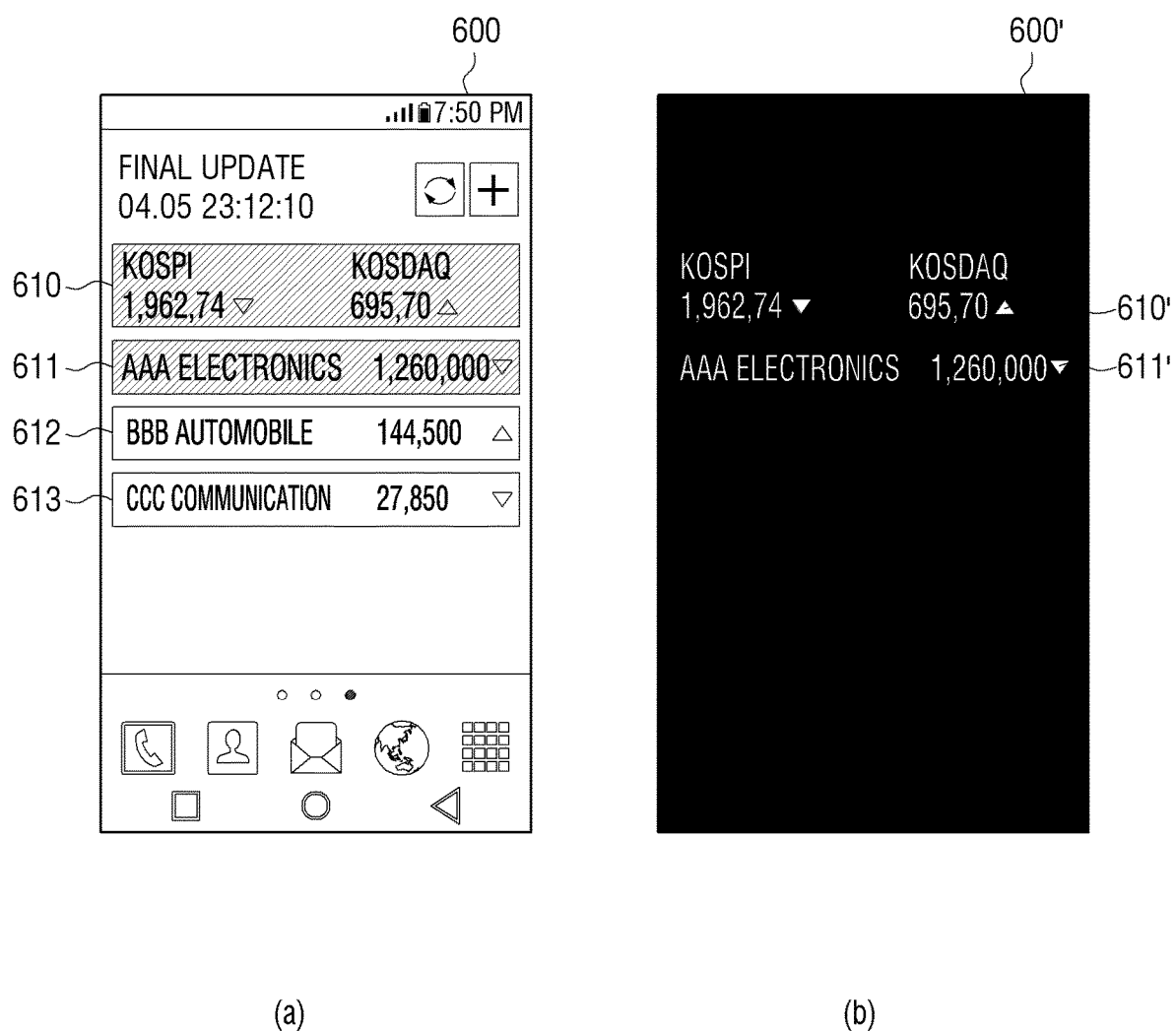
FIG. 12 is a fourth view provided to show displaying a selected object as an always-on display in a display apparatus according to another embodiment of the present disclosure.

FIG. 12 is a fourth view provided to show displaying a selected object as an always-on display in a display apparatus according to another embodiment of the present disclosure.

As shown in part (a) of FIG. 12, the display apparatus 100 may be a portable terminal device such as a smart phone. The display apparatus 100 may display a stock trading UI 600 on a screen. The stock trading UI 600 may include a first object 610 indicating current stock trading amounts and second, third, and fourth objects 611, 612, and 613 which correspond to a stock item selected by a user as an item of interest or a stock item currently being traded by the user.

While stock trading UI 600 is displayed, the display apparatus 100 may receive a user command for always-on display of the displaying stock trading UI 600.

For example, the user may select the first object 610 indicating the stock trading amounts and the second object 611 indicating a stock item A selected by the user, among a plurality of objects included in the stock trading UI 600.

In response to the first object 610 indicating the stock trading amounts and the second object 611 indicating the stock item A being selected, the display apparatus 100 may set the first object 610 indicating the stock trading amounts and the second object 611 indicating the stock item A as the always-on display.

As shown in part (b) of FIG. 12, the display apparatus 100 may display the always-on widget UI with respect to a first object 610' indicating the stock trading amounts and a second object 611' indicating the stock item A, which is set to the always-on display, on a black screen 600' during the standby mode.

The display apparatus 100 may determine whether an edit command with respect to the first and second objects 610 and 611 previously selected by the user is input before displaying the always-on widget UI with respect to the first object 610' indicating the stock trading amounts and the second object 611' indicating the stock item A, which is set to the always-on display, on the black screen 600'. If the edit command is not input, the display apparatus 100 may set a color each of the first object 610' indicating the stock trading amounts and the second object 611' indicating the stock item A, which are set to the always-on display, to a predefined solid color and display the always-on widget UI with respect to the first and second objects 610' and 611' of which colors are set to the predefined color on the black screen 600'.

FIG. 13 is a fifth view provided to show displaying a selected object as an always-on display in a display apparatus according to another embodiment of the present disclosure.

As shown in part (a) of FIG. 13, the display apparatus 100 may be a portable terminal device such as a smart phone. The display apparatus 100 may display a memo execution UI 700 related to an executing memo application on a screen. The memo execution UI 700 may include sub-memo UIs corresponding to a plurality of memos recorded by a user.

While the memo execution UI 700 is displayed, the display apparatus 100 may receive a user command for the always-on display of the memo execution UI 700.

For example, a user may select a shopping list-related memo UI 710, among the sub-memo UIs corresponding to the plurality of memos included in the memo execution UI 700.

In response to the shopping list-related memo UI 710 being selected, the display apparatus 100 may set an object corresponding to each item in the shopping list included in the shopping list-related memo UI 710 to an object for an always-on display.

As shown in part (b) of FIG. 13, the display apparatus 100 may display an always-on widget UI with respect to an object 710' corresponding to each item in the shopping list included in the shopping list-related memo UI 710, which is set to the always-on display, on a black screen 700' during the standby mode.

The display apparatus 100 may determine whether an edit command is input with respect to the shopping list-related memo UI 710 previously selected by a user before displaying the always-on widget UI with respect to the object 710' corresponding to each item in the shopping list which is set to the always-on display on the black screen 700'. If the edit command is not input, the display apparatus 100 may set a color of the object 710' corresponding to each item in the shopping list which is set to the always-on display to a predefined solid color and display the always-on widget UI with respect to the object 710' set in the predefined solid color on the black screen 700'.

Figure 14:
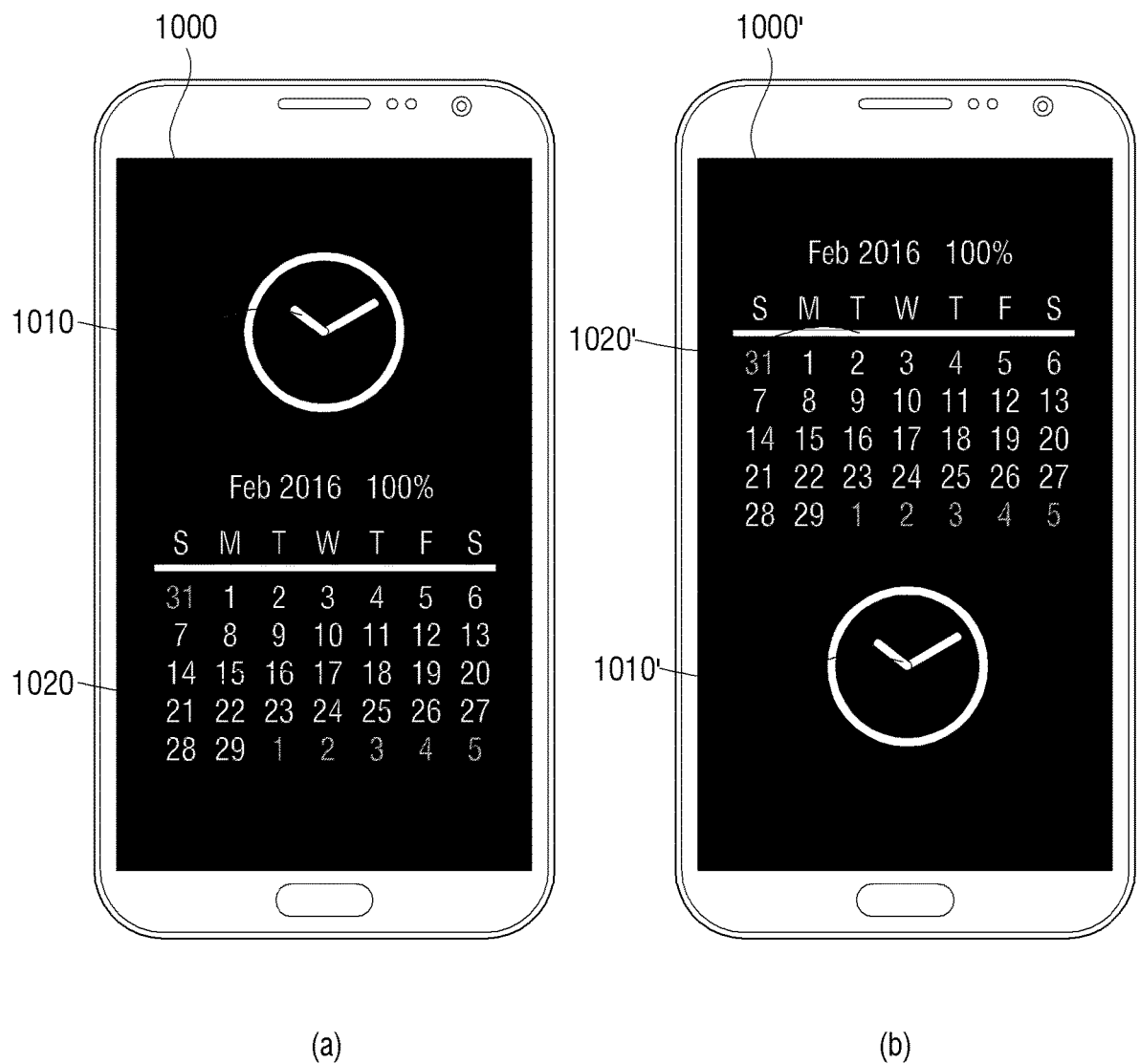
FIG. 14 is a first view provided to show editing an object of an always-on widget UI which is displayed on a screen in a display apparatus according to an embodiment of the present disclosure.

FIG. 14 is a first view provided to show editing an object of an always-on widget UI which is displayed on a screen in a display apparatus according to an embodiment of the present disclosure.

As shown in part (a) of FIG. 14, the display apparatus 100 may display an always-on widget UI with respect to a time-related object 1010 and a schedule-related object 1020 which are set to the always-on display on a black screen 1000.

While the always-on widget UI with respect to the time-related object 1010 and the schedule-related object 1020 is displayed on the black screen 1000, a user may select the time-related object 1010 and drag the selected time-related object 1010. In response to a drag command being input, the display apparatus 100 may move the time-related object 1010 in a direction corresponding to the input drag command and move the schedule-related object 1020 to an area where the time-related object 1010 is disposed before the drag input is input.

Accordingly, as shown in part (b) of FIG. 14, the display apparatus 100 may always display the always-on widget UI with respect to a time-related object 1010' which is moved to the bottom of screen and a schedule-related object 1020' which is moved to the top of screen on a black screen 1000'.

Figure 15:
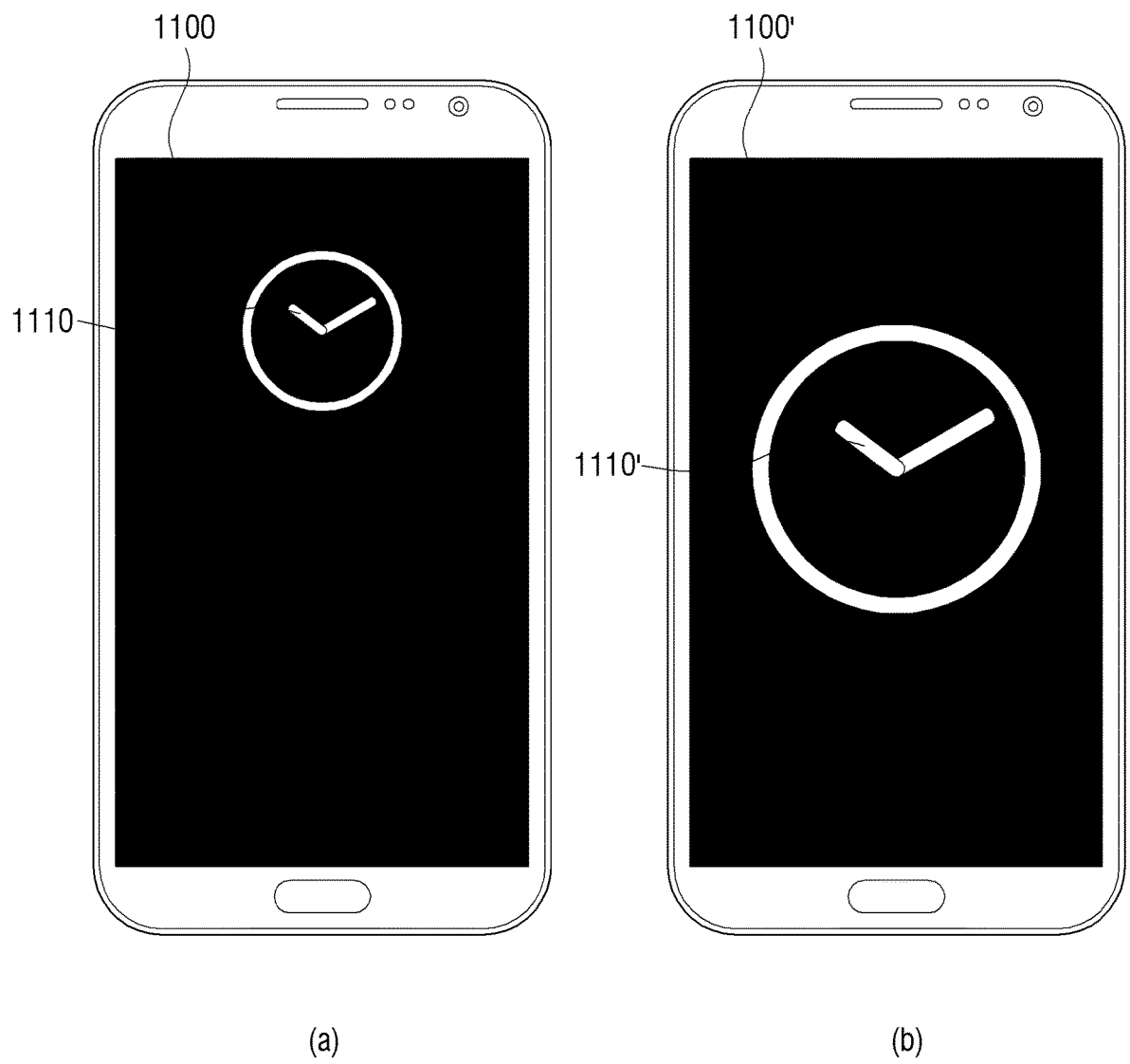
FIG. 15 is a second view provided to show editing an object of an always-on widget UI which is displayed on a screen in a display apparatus according to another embodiment of the present disclosure.

FIG. 15 is a second view provided to show editing an object of an always-on widget UI which is displayed on a screen in a display apparatus according to another embodiment of the present disclosure.

As shown in part (a) of FIG. 15, the display apparatus 100 may display an always-on widget UI with respect to a time-related object 1110 which is set to the always-on display on a black screen 1100.

While the always-on widget UI with respect to the time-related object 1110 is displayed on the black screen 1100, a user may select the time-related object 1110 and zoom in the selected time-related object 1110. For example, a user may touch an area where the time-related object 1110 is displayed of the black screen 1100 where the always-on widget UI is displayed by using two fingers and touch the area by stretching two fingers to be apart from each other.

In response to a zoom-in command being input, as shown in part (b) of FIG. 15, the display apparatus 100 may change the size of the time-related object 1110 to a size corresponding to the input zoom-in command and display the always-on widget UI with respect to a time-related object 1110' having a changed size on a black screen 1100'.

Figure 16:
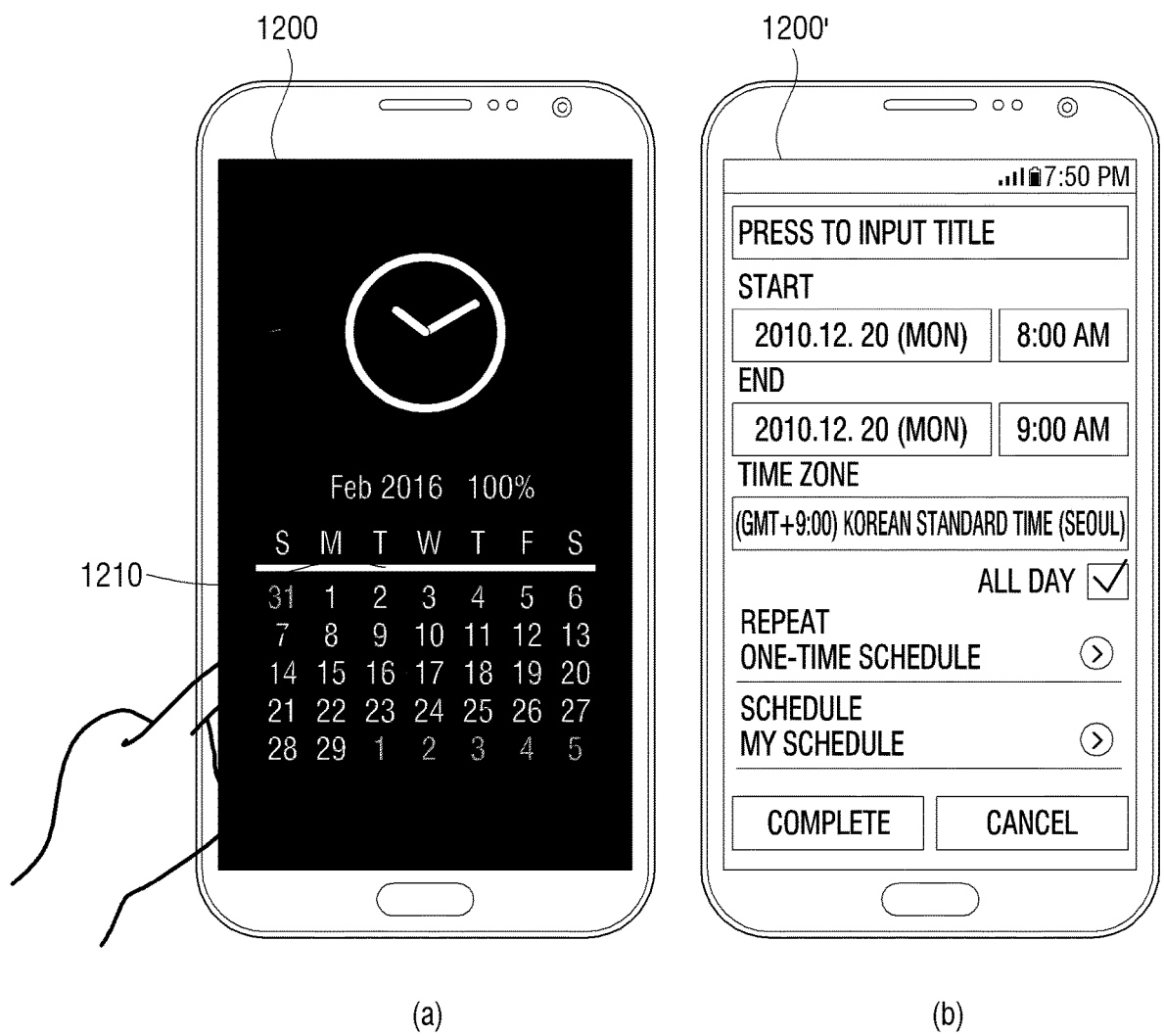
FIG. 16 is a third view provided to show editing an object of an always-on widget UI which is displayed on a screen in a display apparatus according to another embodiment of the present disclosure.

FIG. 16 is a third view provided to show editing an object of an always-on widget UI which is displayed on a screen in a display apparatus according to another embodiment of the present disclosure.

As shown in part (a) of FIG. 16, the display apparatus 100 may display an always-on widget UI with respect to a time-related object and a schedule-related object which are set to the always-on display on a black screen 1200.

While the always-on widget UI with respect to the time-related object and the schedule-related object which are set to the always-on display is displayed on the black screen 1200, a user may select an area 1210 where the schedule-related object is displayed.

In response to a selection command being input, as shown in part (b) of FIG. 16, the display apparatus 100 may display an execution screen 1200' with respect to a schedule widget UI related to the schedule-related object on the black screen 1200 where the always-on widget UI is displayed by changing the mode of the display apparatus 100 from the standby mode to the normal mode.

However, the present disclosure is not limited thereto, but in response to the area 1210 where the schedule-related object is display being selected, the display apparatus 10 may change a screen from the black screen 1200 where the always-on widget UI is displayed to an unlock screen. In response to a user command for releasing the unlock screen being input, the display apparatus 100 may display the execution screen 1200' with respect to the schedule widget UI regarding the schedule-related object by changing the mode of the display apparatus to the normal mode.

FIG. 17 is a fourth view provided to show editing an object of an always-on widget UI which is displayed on a screen in a display apparatus according to another embodiment of the present disclosure.

As shown in part (a) of FIG. 17, the display apparatus 100 may display an always-on widget UI with respect to a time-related object 1311 which is set to the always-on display on a black screen 1310. While the always-on widget UI is displayed on the black screen 1310, a user may place the black screen 1310 of the display apparatus 100 in a direction where the black screen 1310 touches a ground.

In response to an operation state according to a user behavior being sensed, the display apparatus 100 may determine that an event of deleting the time-related object 1311 which is set to the always-on display occurs according to the sensed operation state. When it is determined that the event of deleting occurs, as shown in part (b) of FIG. 17, the display apparatus 100 may display a black screen 1310' where the always-on widget UI with respect to the time-related object 1311 is removed.

For example, according to a user behavior, the display apparatus 100 may be disposed so that the black screen 1310 where the always-on widget UI is displayed faces a table surface.

When the black screen 1310 displaying the always-on widget UI faces a table surface, a sensing value sensed by a luminance sensor 171 described below may be less than a predetermined threshold value. Based on the sensing value, when it is determined that an event of deleting the time-related object 1311 which is set to the always-on display occurs, the display apparatus 100 may display the black screen 1310' where the always-on widget UI with respect to the time-related object 1311 is removed.

While the black screen 1310' where the always-on widget UI with respect to the time-related object 1311 is removed is displayed, when the sensing value sensed by the luminance sensor 171 is less than the predetermined threshold value, the display apparatus 100 may determine that a replay event with respect to the time-related object 1311 set to the always-on display occurs. When it is determined that the replay event is occurs, as shown in (a) of FIG. 13, the display apparatus 100 may display the always-on widget UI with respect to the time-related object 1311 which is set to the always-on display on the black screen 1310.

FIG. 18 is a fifth view provided to show editing an object of an always-on widget UI which is displayed on a screen in a display apparatus according to another embodiment of the present disclosure.

As shown in part (a) of FIG. 18, the display apparatus 100 may display the always-on widget UI with respect to a music replay-related object 1410 which is set to the always-on display on a black screen 1400a. While the always-on widget UI is displayed on the black screen 1400a, a user may put the display apparatus 100 in a trouser pocket.

In response to an operation state according to a user behavior being sensed, the display apparatus 100 may determine that an event of deleting the music replay-related object 1410 which is set to the always-on display occurs according to the sensed operation state. When it is determined that the event of deleting occurs, the display apparatus 100 may remove the always-on widget UI with respect to the music replay-related object 1410 which is displayed on the black screen 1400a.

The display apparatus 100 may search peripheral devices capable of wireless communication, among a plurality of pre-registered peripheral devices. As shown in part (b) of FIG. 18, when a wearable device (not shown) capable of establishing wireless communication with the display apparatus 100 is retrieved, the display apparatus 100 may transmit data with respect to the music replay-related object 1410 to the wearable device (not shown).

Accordingly, the wearable device (not shown) may display the always-on widget UI with respect to a music replay-related object 1410' which is set to the always-on display on a black screen 1400b based on the data received from the display apparatus 100.

The operation of displaying an always-on widget UI with respect to an object which is set to an always-on display on a black screen during a standby mode in the display apparatus 100 according to the present disclosure has been described in detail.

Hereinafter, the detailed elements constituting the display apparatus 100 will be described.

Figure 19:
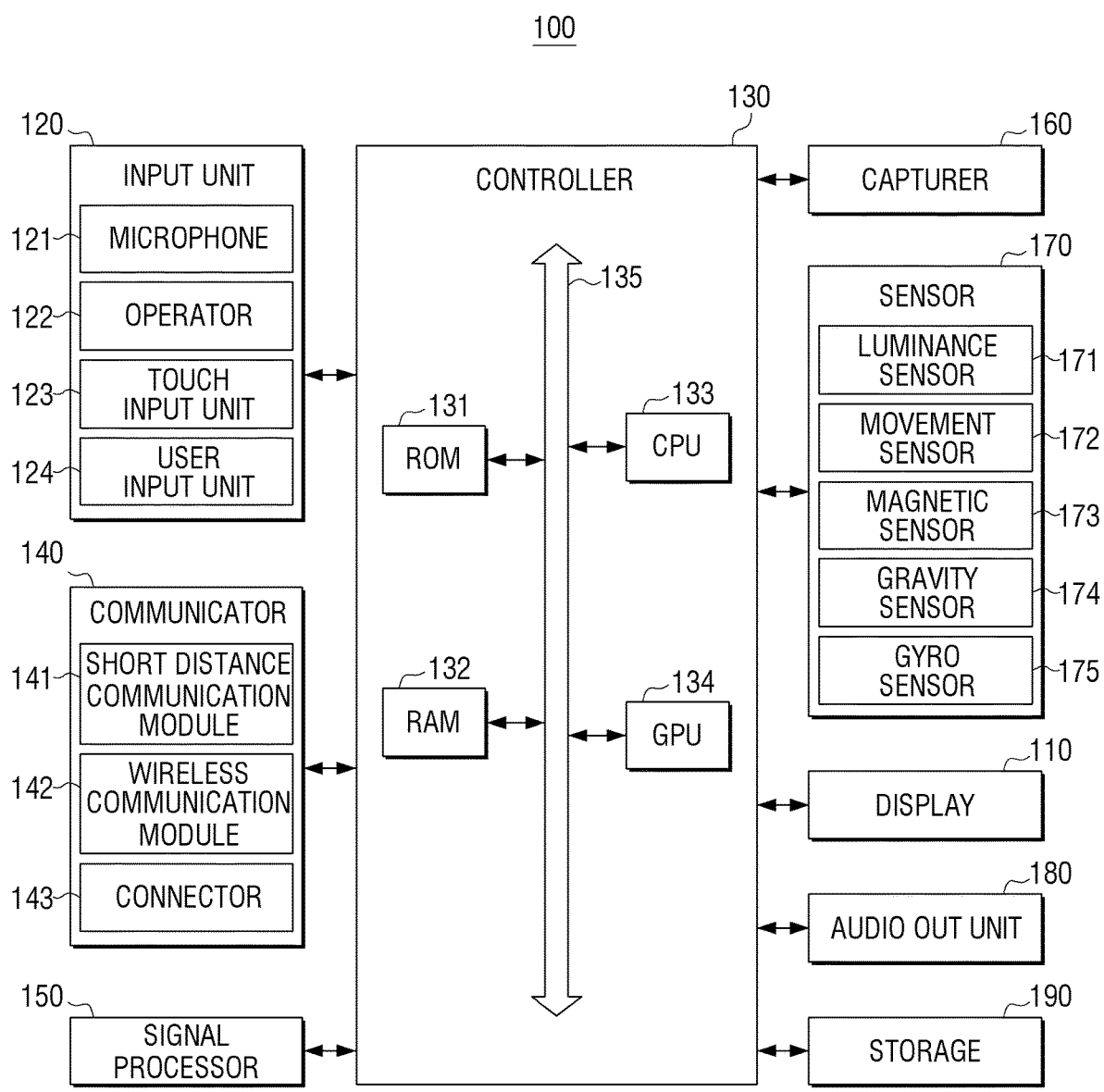
FIG. 19 is a detailed block view illustrating a display apparatus according to an embodiment of the present disclosure.

FIG. 19 is a detailed block view illustrating a display apparatus according to an embodiment of the present disclosure.

Referring to FIG. 19, the display apparatus 100 may include not only the display 110, the input unit 120, and the controller 130 described above, but also a communicator 140 (e.g., a transceiver), a signal processor 150, a capturer 160, a sensor 170, an audio output unit 180 and a storage 190.

The input unit 120 described above may be an input means for receiving various user commands to transmit to the controller 130 and include a microphone 121, an operator 122, a touch input unit 123 and a user input unit 124.

The microphone 121 may receive a voice command of a user and the operator 122 may be embodied as a key pad having various function keys, numeric keys, special keys, character keys, and the like. In addition, the touch input unit 123 may be embodied as a touch pad forming an interactive layer structure with the display 110 when the display 110 is embodied as a touch screen. In this case, the touch input unit 123 may receive a selection command with respect to at least one of icons related to various applications displayed on the display 110 and an execution UI related to an executing application.

The user input unit 124 may receive an infrared (IR) signal or a radio frequency (RF) signal for controlling operations of the display apparatus 100 from at least one peripheral device (not show) such as a remote controller.

The communicator 140 may perform communication with a plurality of pre-registered peripheral devices (not shown).

The communicator 140 may include a connector 143 including at least one of a short-distance communication module 141, a wireless communication module 142 such as a wireless LAN module, and a wire communication module such as a high-definition multimedia interface (HDMI), a universal serial bus (USB), an institute of electrical and Electronic Engineers (IEEE) 1394, and the like.

The short-distance communication module 141 may be an element for wirelessly performing short-distance communication between a plurality of peripheral devices (not shown) communicable with the display device 100. The short-distance communication module 141 may include at least one of a Bluetooth module, an infrared data association (IrDA) module, a near field communication (NFC) module, a WiFi module, and a Zigbee module.

The wireless communication module 142 may be a module that is connected to an external network according to a wireless communication protocol such as IEEE and performs communication. In this case, the display apparatus 100 may perform data communication with a web server (not shown), a contents server (not shown), and the like.

In addition, the wireless communication module may further include a mobile communication module that performs communication by accessing a mobile communication network according to various mobile communication standards such as 3rd generation (3G), 3rd generation partnership project (3 GPP), long term evolution (LTE), and the like.

As described above, the communicator 140 may be embodied by various short-distance communication methods described above, and may adopt other communication technologies not mentioned in this specification as necessary.

The connector 143 may be an element that provides interface with various source devices such as USB 2.0, USB 3.0, HDMI, IEEE 1394, and the like. The connector 143 may receive contents data received from the external server (not shown) through a wire cable connected to the connector 143 according to a control command of the controller 130 or transmit the pre-stored contents data to an external recording medium. In addition, the connector 143 may be supplied with power from a power source through a wire cable physically connected thereto.

The signal processor 150 may be an element for processing image data and audio data of contents received through the communicator 140 or contents stored in the storage 190 according to a control command of the controller 130. Specifically, the signal processor 150 may perform various image processing such as decoding, scaling, noise filtering, frame rate conversion, resolution conversion and the like on the image data included in the contents. In addition, the signal processor 150 may perform various audio signal processing such as decoding, amplification, noise filtering, and the like on the audio data included in the contents, and the signal processed audio data may be output as an audible sound through the audio output unit 180.

The capturer 160 may include a plurality of cameras such as a front camera, a rear camera, etc. for capturing a still image or a video according to a user command.

The sensor 170 may be a sensing sensor for sensing the brightness of surroundings and the movement of the display apparatus 100. The sensor 170 may include a luminance sensor 171, an accelerometer sensor 172, a magnetic sensor 173, a gravity sensor 174, a gyro sensor 175, etc.

The illuminance sensor 171 may sense the brightness of surroundings and the accelerometer sensor 172 may be an acceleration sensor that measures the acceleration or impact intensity of the moving display device 100. In addition, the magnetic sensor 173 may be a sensor that detects an azimuth using earth magnetic field, and the gravity sensor 174 may be a sensor that detects in which direction gravity acts and automatically rotates in a direction where a user holds the display device 100 to sense a direction. The gyroscope or gyro sensor 176 may be a sensor that recognizes a 6-axis direction by rotating the existing accelerometer sensor 172 to recognize a more detailed and precise operation.

The storage 190 may store execution programs, contents, etc. for various applications. In addition, the storage 190 may further store an operation program for controlling operations of the display apparatus 100. The operation program may be read and compiled by the storage 190 when the display apparatus 100 is turned on for operating each element of a user terminal device.

The controller 130 described above may include a central processing unit (CPU) 131, a read only memory (ROM) 132, a random access memory (RAM) 133, and a graphic processing unit (GPU) 134 and the CPU 131, the ROM 132, the RAM 133 and the GPU 134 may be interconnected via a bus.

The CPU 131 may access the storage 190 and perform booting by using an operation system stored in the storage 190. In addition, the CPU 131 may perform various operations by using various programs, contents, data, etc. stored in the storage 190.

The ROM 132 may store a command set, etc. for system booting. When a turn-on command is input and power is supplied, the CPU 131 may copy the operation system stored in the storage 190 to the RAM 133 according to a command stored in the ROM 132 and perform the system booting by executing the operation system. After completion of the system booting, the CPU 131 may copy the various programs stored in the storage 190 to the RAM 133 and perform various operations by executing the programs copied to the RAM 133.

The CPU 134 may generate a display screen including various objects such as icons, images, texts, etc. Specifically, the GPU 134 may calculate an attribute value such as a coordinate value, a shape, a size, and a color of each object to be displayed according to the layout of the screen based on the received control command and generate a display screen having various layouts including the objects based on the calculated attribute values.

The controller 130 may be embodied as a system-on-a-chip (SOC) or a system on chip (SoC) in combination with each of the above-described elements.

The operation of the controller 130 may be performed by a program stored in the storage 190 described above. The storage 190 may be embodied as one of the ROM 132, the RAM 133, a memory card (e.g. a secure digital (SD) card or a memory stick) detachable from/attachable to the display apparatus 100, a non-volatile memory, a volatile memory, a hard disk drive (HDD) or a solid state drive (SSD).

Figure 20:
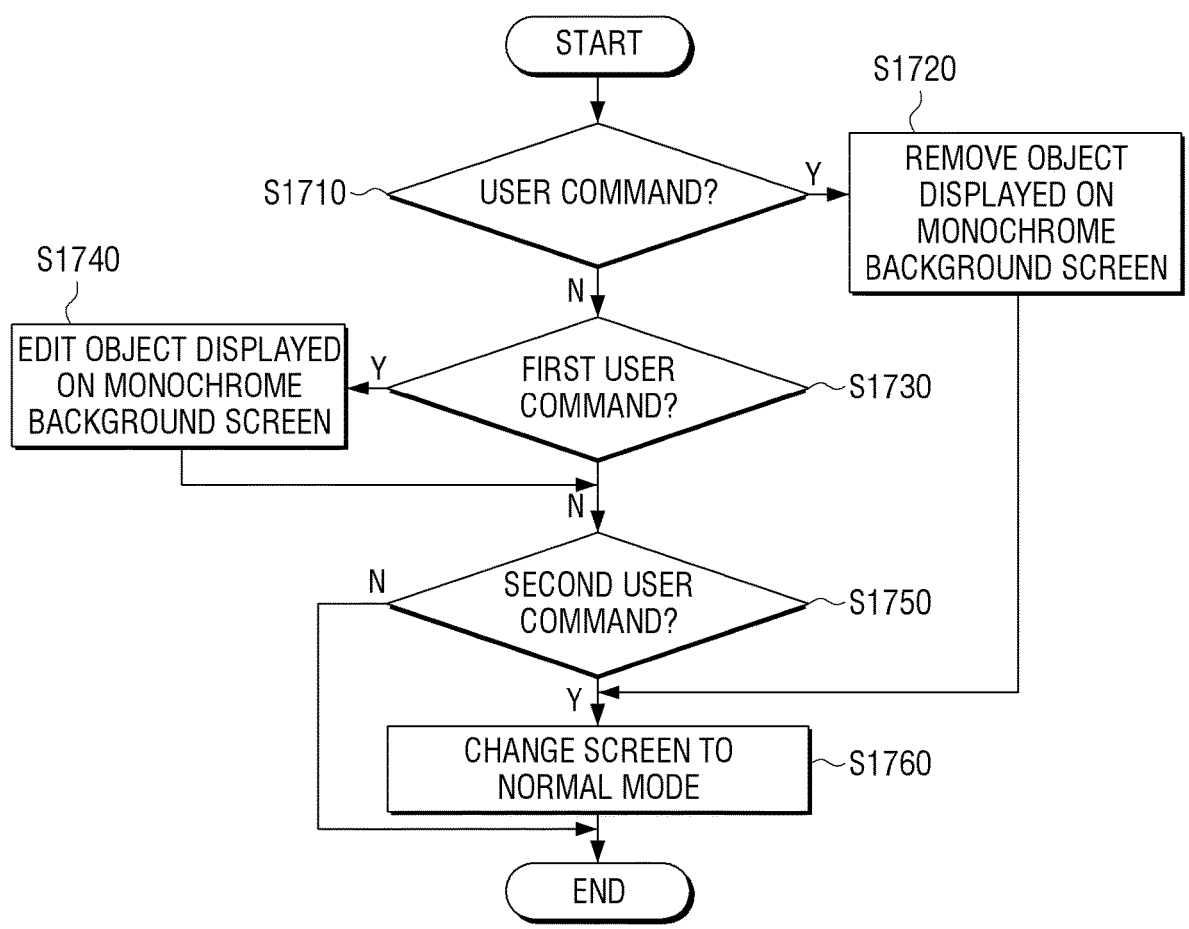
FIG. 20 is a flow chart showing a method of editing an object which is always displayed on a monochrome background screen in a display apparatus according to an embodiment of the present disclosure.

Each element and operation of the display apparatus 100 according to the present disclosure has been described in detail. FIG. 20 is a flow chart showing a method of editing an object which is always displayed on a monochrome background screen in a display apparatus according to an embodiment of the present disclosure.

Referring to FIG. 20, the display apparatus 100 may sense an operation state of the display apparatus 100 during maintaining a standby mode and determine whether an event of editing an object which is set to an always-on display occurs on a monochrome background screen based on the sensing result in operation S1710.

In other words, the display apparatus 100 may determine whether to remove the object which is set to the always-on display from the monochrome background screen depending on whether the sensed operation state is predetermined state. As a result of determination, when it is determined that the event of editing occurs, the display apparatus 100 may remove the object set to the always-on display from the monochrome background screen in operation S1720.

When it is determined that the event of editing does not occur, the display apparatus 100 may determine whether a first user command with respect to the object displayed on the monochrome background screen is input while maintaining the standby mode in operation S1730. As a result of determination, when the first user command is input, the display apparatus 100 may edit the object set to the always-on display on the monochrome background screen in operation S1740.

According to an embodiment, the display apparatus 100, in response to the first user command for moving the object displayed on the monochrome background screen being input while maintaining the standby mode, may performing editing so that the object is displayed on an area corresponding to the input first user command.

The user command for moving the object displayed on the monochrome background screen may be a touch and drag command, a touch and tap command, and the like. Accordingly, the display apparatus 100 may move the object displayed on the monochrome background screen to the point corresponding to the input user command for displaying while maintaining the standby mode.

According to another embodiment, the display apparatus 100, in response to a touch command with respect to an object displayed on a monochrome background screen being input while maintaining a standby mode, may display a menu for setting a display form of the object according to the input touch command According to an embodiment, the display apparatus 100, in response to the touch command with respect to the object displayed on the monochrome background screen being input, may compare a touch input time of the input touch command with a predetermined critical time. As a result of comparison, if the touch input time is longer than the predetermined critical time, the display apparatus 100 may display a menu for setting a display form of the object on a peripheral area of the object displayed on the monochrome background screen.

The menu for setting the display form may be a menu for setting at least one of color, size and update information of the object displayed on the monochrome background screen. Therefore, a user may reset the display form of the object through the displayed menu. In response to a setting command being input, the display apparatus 100 may reset the object displayed on the monochrome background screen in a display form corresponding to the input setting command for displaying.

At operation S1730 described above, if the first user command is not input or a second user command is input while an object edited in a display form corresponding to the first user command is always displayed on the monochrome background screen, the display apparatus 100 may display a screen corresponding to the object displayed on the monochrome background screen by changing the mode of the display apparatus 100 from the standby mode to the normal mode in operations S1750 and S1760.

For example, the second user command may be a touch command for the object displayed on the monochrome background screen while the standby mode is maintained. When the touch command is input shorter than the preset first critical time, the display apparatus 100 may change the mode thereof to the normal mode and display an execution screen corresponding to the object displayed on the monochrome background screen.

Meanwhile, a control method of the display device according to various embodiments described above may be coded by software and stored in a non-transitory readable medium. Such the non-transiently readable media may be mounted on various devices to be used.

The non-transitory computer readable recording medium may refer to a medium that stores data and that can be read by devices. In detail, the aforementioned various applications or programs may be stored in the non-transitory computer readable medium, for example, a compact disc (CD), a digital versatile disc (DVD), a hard disc, a Blu-ray disc, a USB, a memory card, a ROM, and the like, and may be provided.

The recording medium readable by a computer may disperse in computer systems that are connected over a network so that a code readable by a computer may be stored and executed in a dispersion method. Functional programs, code and code segments for implementing the above method can be easily inferred by programmers of the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a display; and
   at least one processor configured to:
   control the display to display a screen including a plurality of objects while the display apparatus is in a normal mode, the plurality of objects being displayed at a plurality of positions on the screen, respectively,
   in response to a predefined user command being input, enter a setting mode for setting at least one object from among the plurality of objects displayed on the display as an always-on display object,
   in response to at least one object from among the plurality of objects being selected during the setting mode, set the at least one object to the always-on display object,
   in response to a mode of the display apparatus being changed to a standby mode, control the display to display the at least one object on a monochrome background screen, the at least one object being displayed at, at least one position of the monochrome background screen corresponding to at least one position where the at least one object is displayed on the screen in the normal mode, and
   in response to the mode of the display apparatus being changed from the standby mode to normal mode, control the display to the screen including the plurality of objects.

2. The display apparatus as claimed in claim 1, wherein the at least one processor is further configured to control the display to display the at least one object on an area where the at least one object is previously displayed of the monochrome background screen.

3. The display apparatus as claimed in claim 1, wherein the at least one processor, in response to a user command being input to an object displayed on the monochrome background screen while the standby mode is maintained, is further configured to move the displayed object according to the user command.

4. The display apparatus as claimed in claim 2, wherein the at least one processor, in response to the at least one of the plurality of objects being selected, is further configured to control the display to display a menu for setting a display form with respect to the at least one of the plurality of objects.

5. The display apparatus as claimed in claim 1,
   wherein the at least one object comprises an updatable object in a widget form, and
   wherein the at least one processor is further configured to:
   update the at least one object in the widget form, and
   control the display to display the updated object on the monochrome background screen.

6. The display apparatus as claimed in claim 1, wherein the at least one processor, in response to a user command with respect to a displayed object being input while the standby mode is maintained, is further configured to:
   change the mode of the display apparatus to the normal mode, and
   control the display to display an execution screen related to the displayed object.

7. The display apparatus as claimed in claim 1, wherein the at least one processor, in response to the predefined user command being input while the standby mode is maintained, is further configured to:
   remove the displayed object, and
   control the display to display an unlock screen of the display apparatus.

8. The display apparatus as claimed in claim 1, further comprising:
   a sensor for sensing a state of the display apparatus,
   wherein the at least one processor is further configured to remove the at least one object from the monochrome background screen if a state of the display apparatus sensed by the sensor is a predetermined state while the standby mode is maintained.

9. The display apparatus as claimed in claim 1, wherein the standby mode comprises a mode for displaying a display screen by changing into a monochrome screen by driving the display of the display apparatus with standby power or turning off a power source of the display according to an input user command or a predetermined time.

10. A method of controlling a display apparatus, the method comprising:
- displaying a screen including a plurality of objects while the display apparatus is in a normal mode, the plurality of objects being displayed at a plurality of positions on the screen, respectively;
- in response to a predefined user command being input, entering a setting mode for setting at least one object from among the plurality of objects displayed on the display as an always-on display object;
- in response to at least one object from among the plurality of objects being selected during the setting mode, setting a selected object to the always-on display object;
- in response to a mode of the display apparatus being changed to a standby mode, displaying the selected object on a monochrome background screen and blocking power to at least one element of the display apparatus, the at least one object being displayed at, at least one position of the monochrome background screen corresponding to at least one position where the at least one object is displayed on the screen in the normal mode; and
- in response to the mode of the display apparatus being changed from the standby mode to the normal mode, displaying to the screen including the plurality of objects.

11. The method as claimed in claim 10, wherein the displaying of the selected object comprises displaying the selected object on an area where the selected object is previously displayed of the monochrome background screen.

12. The method as claimed in claim 10, further comprising:
- in response to a user command being input to an object displayed on the monochrome background screen while the standby mode is maintained, moving the displayed object according to the user command.

13. The method as claimed in claim 11, wherein the setting of the selected object comprises, in response to the at least one of the plurality of objects being selected, displaying a menu for setting a display form with respect to the at least one of the plurality of objects.

14. The method as claimed in claim 10,
- wherein the selected object comprises an updatable object in a widget form, and
- wherein the displaying of the selected object comprises updating and displaying the selected object in the widget form.

15. The method as claimed in claim 10, further comprising:
- in response to a user command with respect to a displayed object being input while the standby mode is maintained, changing the mode of the display apparatus to the normal mode and displaying an execution screen related to the displayed object.

16. The method as claimed in claim 10, further comprising:
- in response to the predefined user command being input while the standby mode is maintained, removing an object displayed on the monochrome background screen and displaying an unlock screen of the display apparatus.

17. The method as claimed in claim 10, further comprising:
- sensing a state of the display apparatus while the standby mode is maintained; and
- removing the selected object from the monochrome background screen if a state of the display apparatus is a predetermined state.

18. The method as claimed in claim 10, wherein the standby mode comprises a mode for displaying a display screen by changing into a monochrome screen by driving a display of the display apparatus with standby power or turning off a power source of the display according to an input user command or a predetermined time.

19. The method as claimed in claim 10, wherein the always-on display object is configured to be changed according to updated information.

* * * * *